United States Patent
Kozlovsky et al.

(10) Patent No.: US 12,244,084 B2
(45) Date of Patent: Mar. 4, 2025

(54) INTERCONNECTION SYSTEM, CASE ASSEMBLY, ELECTRICAL CONNECTOR, ASSEMBLY AND CONNECTOR ASSEMBLY USING DETACHABLE, CABLED FRONT-PANEL CONNECTOR

(71) Applicant: Samtec, Inc., New Albany, IN (US)

(72) Inventors: Christina Kozlovsky, New Albany, IN (US); Jignesh H. Shah, New Albany, IN (US); Eric J. Zbinden, New Albany, IN (US)

(73) Assignee: Samtec, Inc., New Albany, NY (US)

( * ) Notice: Subject to any disclaimer, the term of this patent is extended or adjusted under 35 U.S.C. 154(b) by 311 days.

(21) Appl. No.: 17/768,681

(22) PCT Filed: Nov. 12, 2020

(86) PCT No.: PCT/US2020/060186
§ 371 (c)(1),
(2) Date: Apr. 13, 2022

(87) PCT Pub. No.: WO2021/097062
PCT Pub. Date: May 20, 2021

(65) Prior Publication Data
US 2023/0299520 A1  Sep. 21, 2023

Related U.S. Application Data

(60) Provisional application No. 62/934,187, filed on Nov. 12, 2019.

(51) Int. Cl.
*H01R 12/70* (2011.01)
*H01R 12/71* (2011.01)
(Continued)

(52) U.S. Cl.
CPC ....... *H01R 12/7082* (2013.01); *H01R 12/716* (2013.01); *H01R 12/75* (2013.01); *H01R 13/6583* (2013.01); *H04B 1/38* (2013.01)

(58) Field of Classification Search
CPC .. H01R 12/7082; H01R 12/716; H01R 12/75; H01R 13/6583
(Continued)

(56) References Cited

U.S. PATENT DOCUMENTS 6,816,376 B2  11/2004  Bright et al.
6,986,679 B1  1/2006  Aronson et al.
(Continued)

FOREIGN PATENT DOCUMENTS

CN  104979678 A  10/2015
TW  201352111 A  12/2013
(Continued)

OTHER PUBLICATIONS

Official Communication issued in International Patent Application No. PCT/US2020/060186, mailed on Mar. 2, 2021.
(Continued)

*Primary Examiner* — Gary F Paumen
(74) *Attorney, Agent, or Firm* — Keating and Bennett, LLP

(57) ABSTRACT

An interconnection system is configured to be carried by a substrate and includes a cage that is configured to be connected to the substrate, that includes a first end and a second end opposed to the first end, and that is configured to receive an interconnection module; and an electrical connector located at the second end of the cage. The electrical connector includes a fixed connector that is configured to be rigidly attached to the substrate and a detachable connector that is configured to be mated and unmated from the fixed connector.

19 Claims, 18 Drawing Sheets

(51) Int. Cl.
  *H01R 12/75* (2011.01)
  *H01R 13/6583* (2011.01)
  *H04B 1/38* (2015.01)

(58) Field of Classification Search
  USPC .......................................................... 439/78
  See application file for complete search history.

(56) References Cited

U.S. PATENT DOCUMENTS

| | | |
|---|---|---|
| 7,371,965 B2 | 5/2008 | Ice |
| 7,457,126 B2 | 11/2008 | Ahrens |
| 8,879,267 B2 | 11/2014 | Henry et al. |
| 8,885,342 B2 | 11/2014 | Skepnek et al. |
| 8,974,125 B2 | 3/2015 | McColloch et al. |
| 9,011,177 B2 | 4/2015 | Lloyd et al. |
| 9,246,280 B2 | 1/2016 | Neer et al. |
| 9,325,100 B2 | 4/2016 | Hirschy |
| 9,402,332 B2 | 7/2016 | McKervey et al. |
| 9,696,506 B2 | 7/2017 | Wu et al. |
| 9,761,974 B2 | 9/2017 | L'Esperance et al. |
| 9,793,667 B1 | 10/2017 | Park et al. |
| 9,851,519 B1 | 12/2017 | Van Gaal |
| 9,910,231 B2 | 3/2018 | Kelty et al. |
| 9,924,615 B2 | 3/2018 | Bucher |
| 10,114,182 B2 | 10/2018 | Zbinden et al. |
| 10,153,571 B2 | 12/2018 | Kachlic |
| 10,375,859 B2 | 8/2019 | Wanha |
| 10,476,198 B1 | 11/2019 | Pogash et al. |
| 10,564,366 B2 | 2/2020 | Chan et al. |
| 10,581,210 B2 | 3/2020 | Pogash et al. |
| 10,651,606 B2 | 5/2020 | Little |
| 10,680,389 B2 | 6/2020 | Little |
| 10,765,821 B2 * | 9/2020 | Raichman ................ A24D 1/20 |
| 10,788,637 B2 | 9/2020 | Ikonomov et al. |
| 10,873,161 B2 | 12/2020 | Henry et al. |
| 10,950,997 B2 | 3/2021 | Dambach et al. |
| 11,070,006 B2 | 7/2021 | Gailus et al. |
| 11,101,611 B2 | 8/2021 | Winey et al. |
| 2013/0273766 A1 | 10/2013 | Lindkamp |
| 2015/0296638 A1 | 10/2015 | Wu et al. |
| 2016/0007488 A1 | 1/2016 | Neustadt |
| 2016/0218455 A1 | 7/2016 | Sayre et al. |
| 2017/0077643 A1 | 3/2017 | Zbinden et al. |
| 2018/0233853 A1 | 8/2018 | Janowiak et al. |
| 2020/0153163 A1 | 5/2020 | Guetig et al. |

FOREIGN PATENT DOCUMENTS

| | | |
|---|---|---|
| TW | M492596 U | 12/2014 |
| TW | M627986 U | 6/2022 |
| WO | 2019/099447 A2 | 5/2019 |
| WO | 2019/104059 A1 | 5/2019 |

OTHER PUBLICATIONS

Official Communication issued in Taiwanese Application No. 109139557, mailed on Mar. 30, 2021.
Official Communication issued in Taiwanese Application No. 109214951, mailed on Mar. 2, 2021.
Official Communication issued in Taiwanese Application No. 109139557, mailed on Jul. 1, 2021.
Official Communication in TW109139557, issued on Jun. 20, 2022, 3 pages.

* cited by examiner

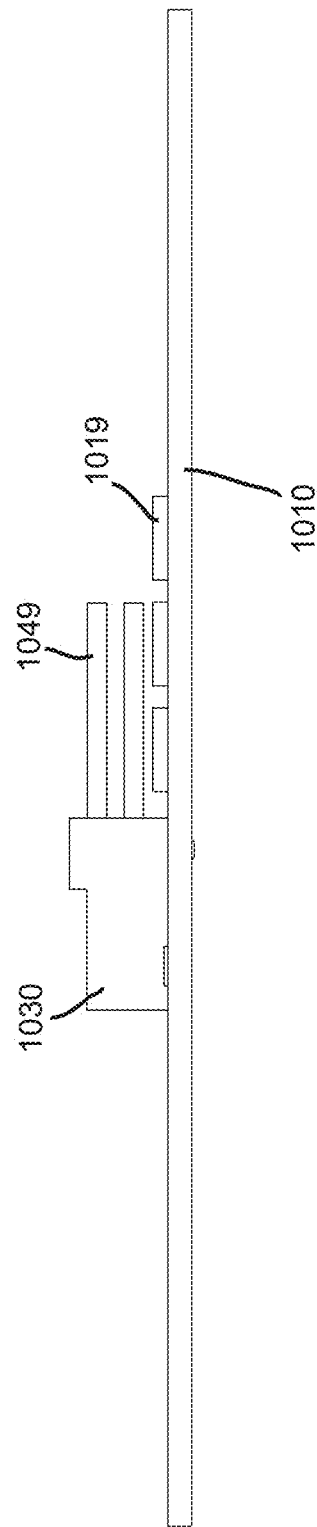

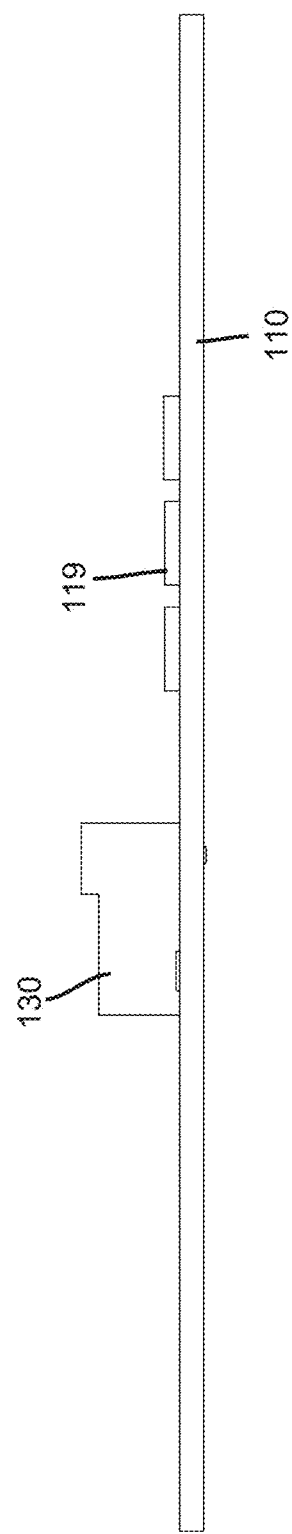

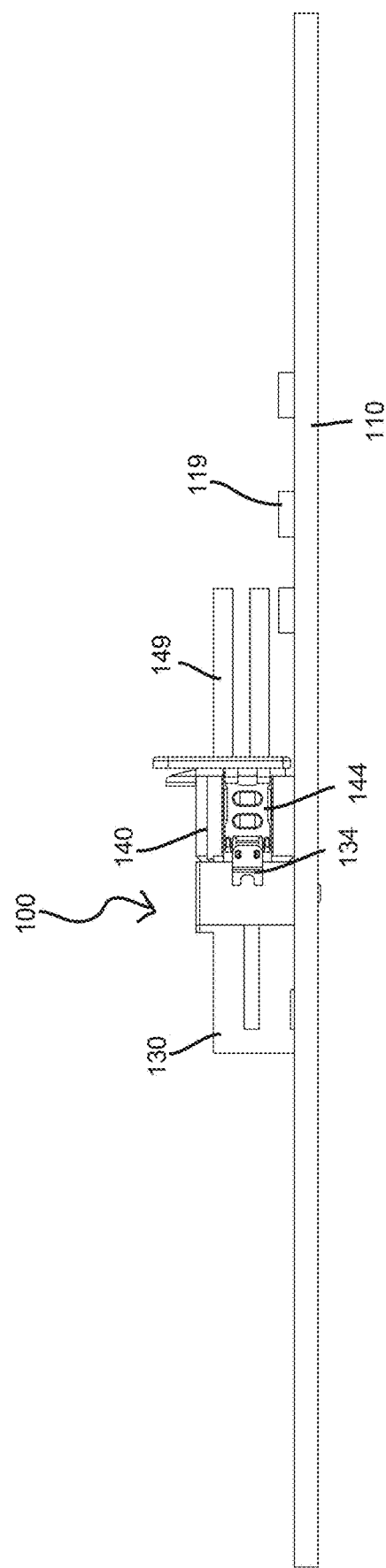

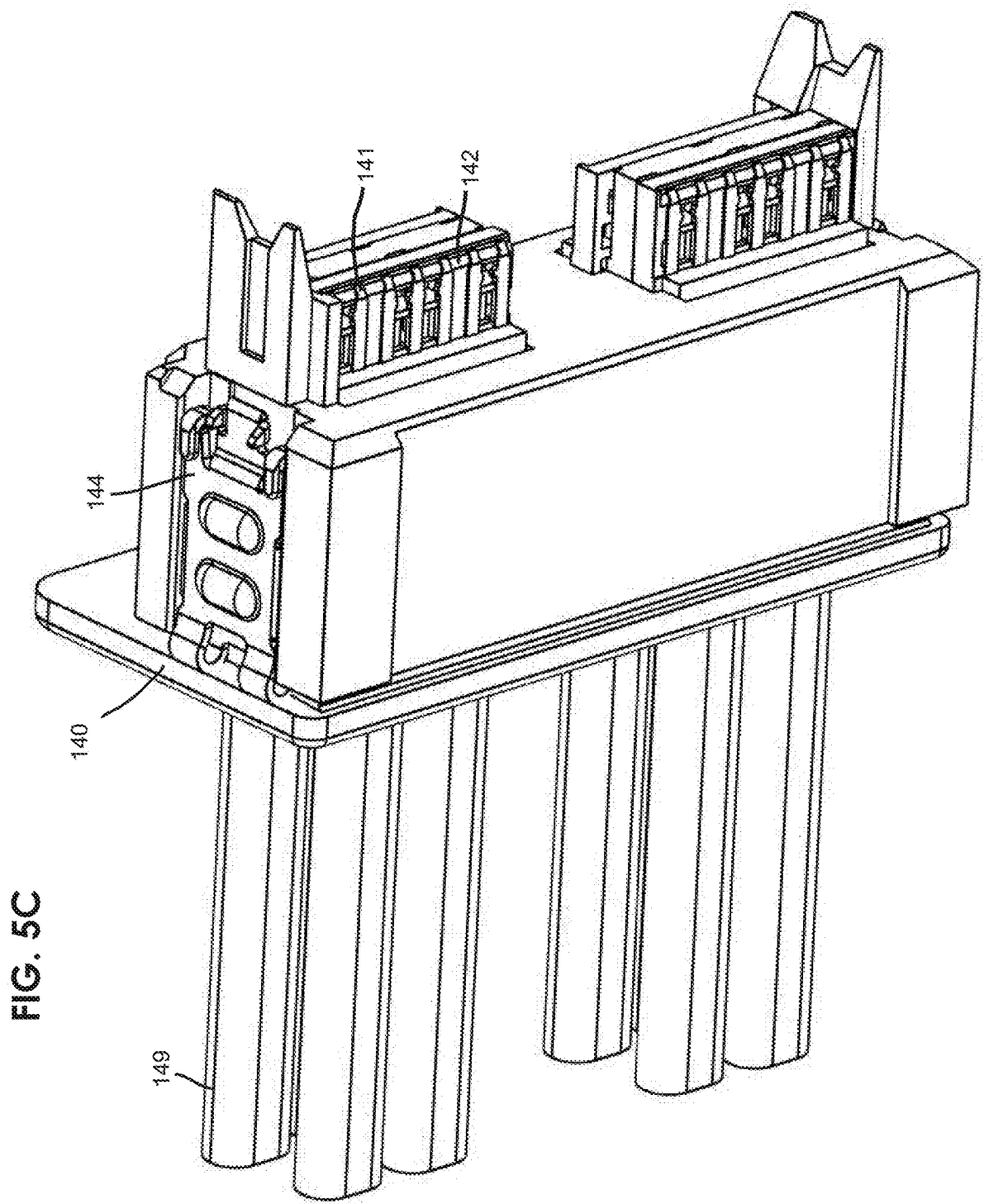

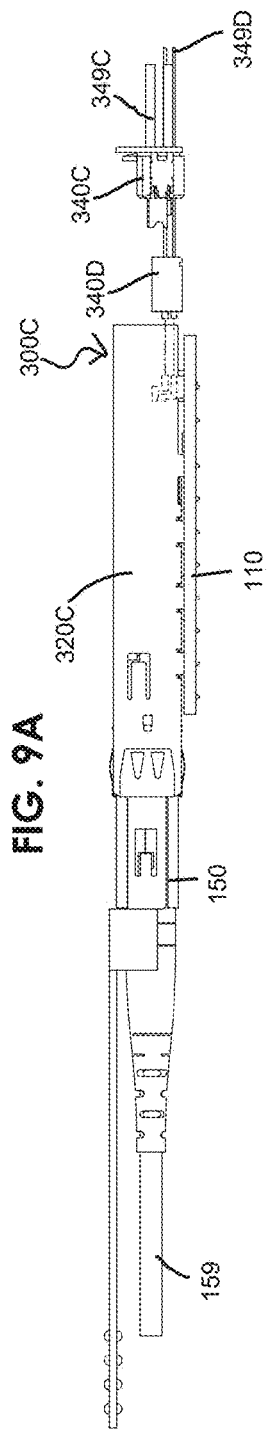
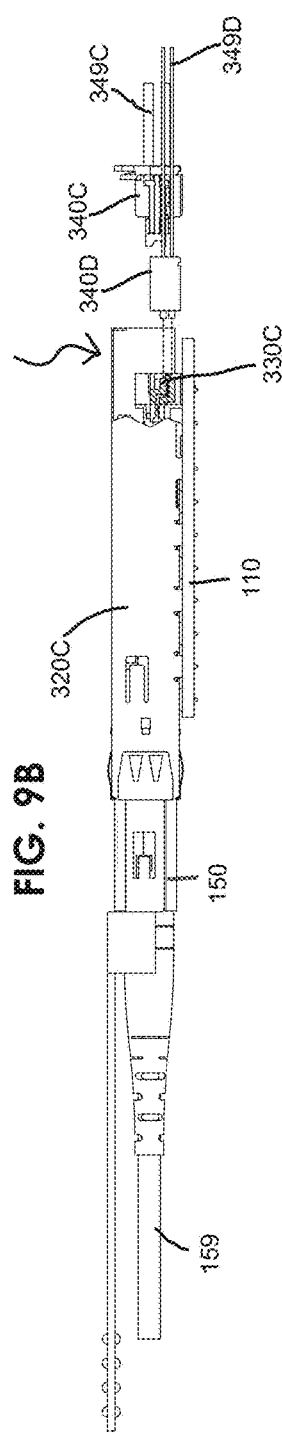
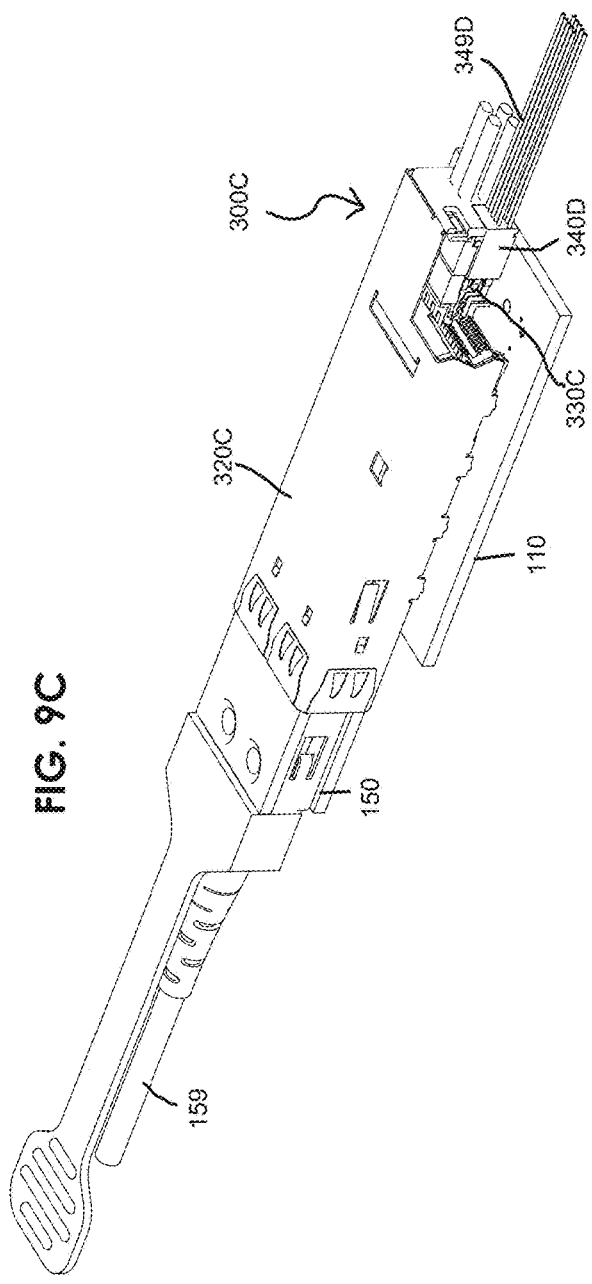

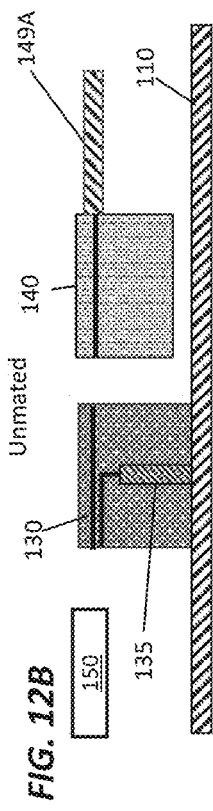
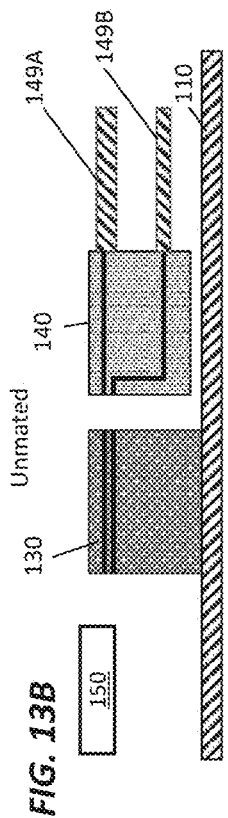
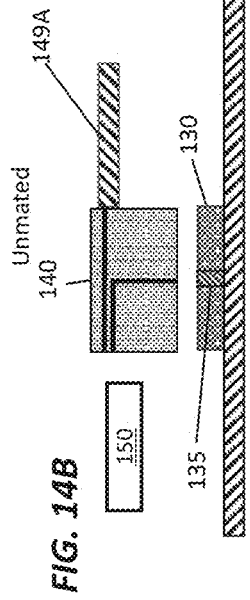
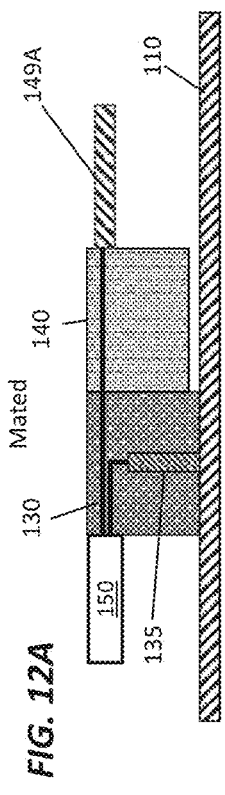
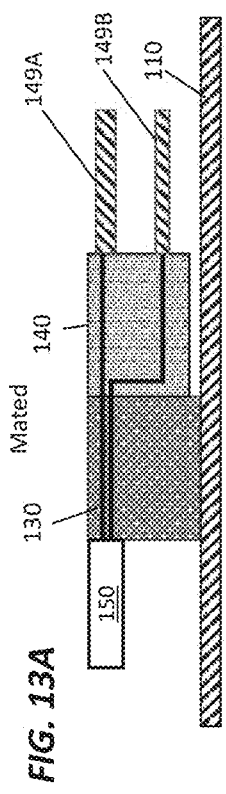
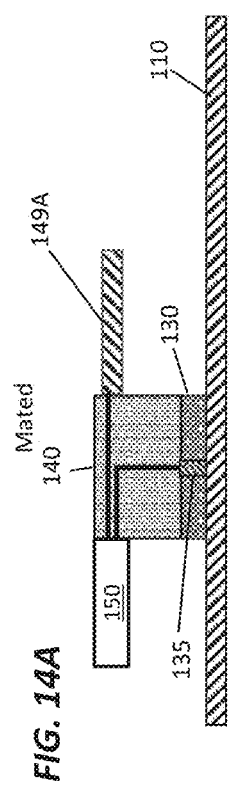

INTERCONNECTION SYSTEM, CASE ASSEMBLY, ELECTRICAL CONNECTOR, ASSEMBLY AND CONNECTOR ASSEMBLY USING DETACHABLE, CABLED FRONT-PANEL CONNECTOR

BACKGROUND OF THE INVENTION

1. Field of the Invention

The present invention relates to a detachable, cabled front-panel connector. More specifically, the present invention relates to an electrical connector that includes a fixed connector and a detachable connector.

2. Description of the Related Art

Electronics racks are standard components for mounting a wide variety of electronic components and equipment in data, computing, and communication systems. Data centers typically have large numbers of racks, each filled with various pieces of electronic equipment, for example, servers. A standard electrical rack has a width of about 19", which is able support assemblies that mount into the rack with a width of about 17.25". Multiple assemblies can be mounted in each rack, with the assemblies stacked vertically. The assemblies are typically supported by a front panel that is defined by cut-outs in a flat piece of sheet metal that includes clearance holes or slots along the side edges of the front panel to secure the front panel to the rack by fasteners. The front panel often has additional holes or slots that enable electrical connection of an interconnection module to a rack-mounted printed circuit board (PCB) or substrate that is located behind the front panel (i.e., the PCB or substrate is located inside the rack). The rack mounted PCB is arranged generally perpendicular to the front panel. The interconnection module may terminate an electrical or optical cable.

The rapid increase in data storage and high-bandwidth communication due to the expansion of the Internet has increased the need for dense interconnection systems in data centers. Data centers typically include rows of racks of servers, and these servers are typically in high-bandwidth communication with other servers located both in the same data center and in other data centers. High-bandwidth communication can be supported by either shielded electrical cables or active optical links. Active optical link uses an optical fiber to transport, i.e., transmit and/or receive, optical signals and can support longer transmission distances and higher transmission bandwidths than an electrical link using an electrical cable. An active optical link may include an optical engine incorporated into a transceiver on at least one end of an optical cable that transforms electrical signals into optical signals (transmission (Tx) function) and transforms optical signals into electrical signals (receiver (Rx) function). An electronics rack can have hundreds or even thousands of interconnections. As bandwidth requirements increase, there is a need to provide a rack mounting system that provides dense packaging of the front panel interconnections.

A prior art design for a QSFP (Quad Small Form Factor) interconnection system is shown in FIGS. 1A and 1B. FIG. 1A shows a connector 1030 mounted to a host printed circuit board (PCB) or substrate 1010. FIG. 1B is a side view of an electrical interconnection system including an interconnection module 1050 and the connector 1030 (not visible in FIG. 1B) provided in a cage 1020. The interconnection module 1050 includes a cable 1059 on an outboard side of the interconnection module 1050, i.e., a side of the interconnection module 1050 facing away from front panel 1015. The cable 1059 may be an electrical cable, an optical cable, or a combination of both electrical and optical cables. A card-edge 1060 with contact pads located on both upper and lower surfaces may be located on an inboard side of the interconnection module 1050, i.e., the opposite side of the interconnection module 1050 as the cable 1059. The card edge 1060 is configured to mate with the connector 1030.

As shown in FIGS. 1A and 1B, electrical cables 1049, for example, twin axial cables, are fixed to the inboard side of the connector 1030, which is the side of a connection within the electronics rack, with respect to a front panel 1015 of the electronics rack. The outboard side of the connector 1030 is the side of a connection facing outward from the front panel 1015 of the electronics rack. High-speed signal(s) to and from the connector 1030 may be transported via the electrical cables 1049. Power and control signals to and from the connector 1030 may be provided to substrate 1010 via press fit contacts or the like. The electrical cables 1049 may be referred to as "flyover cables," since the electrical cables 1049 transport electrical signals above the substrate 1010, for example, with the electrical cables 1049 and the substrate 1010 at least partially spaced away from one another. By including electrical cables 1049, instead of transporting electrical signals through the substrate 1010, improved signal integrity for high-speed data signals may be provided, for example, for signals having a bit rate equal to or greater than about 10 Gbps. The electrical cables 1049 may terminate on the inboard side of the connector 1030 on or adjacent to an integrated circuit (IC) package or the like. FIG. 1B shows an example where the electrical cables are terminated adjacent to an IC package 1019.

The cage 1020, not shown in FIG. 1A and shown in FIG. 1B, surrounds all or a portion of the connector 1030. The connector 1030 is mounted at the inboard or second side of the cage 1020. The outboard side or first side of the cage 1020 includes an opening that is arranged to receive the interconnection module 1050, for example, a QSFP pluggable module. To provide an interconnection, the interconnection module 1050 may be inserted into the cage 1020 and slid toward the connector 1030, located at a rear of the cage 1020, in a module-mating direction. The module-mating direction is perpendicular or substantially perpendicular within manufacturing tolerances to the outward facing surface of the front panel 1015 and is parallel or substantially parallel within manufacturing tolerances to a component mounting surface of the substrate 1010. The cage 1020 provides mechanical guidance of the interconnection module 1050 to the connector 1030 and provides electrical shielding to reduce electrical interference generated by high-speed electrical signals propagating through the connector 1030.

A problem with the design shown in FIGS. 1A and 1B is that the electrical cables 1049 often have a maximum temperature range well below a typical temperature for solder reflow, for example, about 100° C. Thus, any soldering process that occurs after the connector 1030 is mounted to the substrate 1010 may result in overheating of one or more of the electrical cables 1049, which may permanently damage the cable(s) 1049 and possibly render the cable(s) 1049 and the connector 1030 inoperable. In addition, the connector 1030 with the cables 1049 is typically too bulky to be mounted by a surface mount technology (SMT) assembly process. Thus, the connector 1030 must be press fit to the substrate 1010, which significantly limits the reworkability of the assembly.

SUMMARY OF THE INVENTION

Embodiments of the present invention provide detachable, cabled front-panel connectors and electrical interconnection systems that withstand solder reflow temperatures and that are compatible with SMT assembly processes.

According to an embodiment of the present invention, an interconnection system is configured to be carried by a substrate and that includes a cage that is configured to be connected to the substrate, that includes a first end and a second end opposed to the first end, and that is configured to receive an interconnection module; and an electrical connector located at the second end of the cage. The electrical connector includes a fixed connector that is configured to be rigidly attached to the substrate and a detachable connector that is configured to be mated and unmated from the fixed connector.

The interconnection system can further include the substrate, where the cage can be mounted to a first surface of the substrate and where the detachable connector can mechanically float in a direction orthogonal or substantially orthogonal to the first surface of the substrate and may not have to mechanically float in a direction parallel or substantially parallel to the first surface of the substrate. The interconnection system can further include a cable including a first end connected to the detachable connector. The detachable connector can be removable from the cage. The detachable connector can be removable from the cage without desoldering any electrical connections. The fixed connector can include contact fingers that make electrical contact with contact pads on the detachable connector when the detachable connector is mated to the fixed connector. The detachable connector can include contact fingers that make electrical contact with contact pads on the fixed connector when the detachable connector is mated to the fixed connector. The fixed connector may not include any electrical contact.

According to an embodiment of the present invention, an interconnection system includes a cage that includes a first end and a second end opposed to the first end and that is configured to receive an interconnection module, and an electrical connector located at the second end of the cage. The electrical connector includes a fixed connector which includes soldered electrical connections and a detachable connector that is removable from the cage without desoldering any electrical connections, and the detachable connector is configured to directly mate and unmate with the interconnection module when the interconnection module is inserted in the cage.

The first and the second ends of the cage can define a module-mating direction, and the detachable connector can mechanically float in a direction orthogonal or substantially orthogonal to the module-mating direction and may not mechanically float in a direction parallel or substantially parallel to the module-mating direction. The interconnection system can further include a cable including a first end connected to the detachable connector. The detachable connector can be removable from the cage.

According to an embodiment of the present invention, a cage assembly includes a cage including a first end and a second end opposed to the first end, the first and the second ends define a module-mating direction; and a receptacle connector that is located at the second end of the cage and that is configured to receive a card-edge of a mating interconnection module on an outboard side of the receptacle connector. The receptacle connector includes electrical cables attached to the receptacle connector on an inboard side, the inboard side being opposed to the outboard side, and the receptacle connector includes flexible fingers attached to a third side, the third side having a common edge with both the inboard side and the outboard side.

According to an embodiment of the present invention, an electrical connector is configured to be positioned at a rear end of a cage and includes a fixed connector rigidly secured with respect to the cage and a detachable connector removable from the cage.

According to an embodiment of present invention, an assembly includes a cage including a first end and a second end opposed to the first end, the first and the second ends defining a module-mating direction; and a receptacle connector that is located at the second end of the cage and that is configured to receive a card-edge of a mating interconnection module on an outboard side of the receptacle connector. The receptacle connector includes electrical cables attached to the receptacle connector on an inboard side of the receptacle connector, the inboard side being opposed to the outboard side, and the receptacle connector includes flexible fingers attached to a third side of the receptacle connector, the third side having a common edge with both the inboard side and the outboard side.

According to an embodiment of the present invention, an interconnection system includes a first cage including a first electrical connector, a first electrical cable attached to the first electrical connector at a first end of the first electrical cable, a second electrical cable attached to the first electrical connector at a first end of the second electrical cable, a second cage including a second electrical connector, a third electrical cable attached to the second electrical connector at a first end of the third electrical cable, a fourth electrical cable attached to the second electrical connector at a first end of the fourth electrical cable, and a third electrical connector. The third electrical connector is attached to a second end of the first electrical cable and a second end of the third electrical cable.

The interconnection system can further include a fourth electrical connector, where the fourth electrical connector can be attached to a second end of the second electrical cable and a second end of the fourth electrical cable.

According to an embodiment of the present invention, an interconnection system includes electrical cables each including a first end and a second end and each providing an electrical connection between the first end and second end, a first set of electrical connectors each attached to the first end of one of the electrical cables, and a second set of electrical connectors each attached to the second end of one of the electrical cables. At least one electrical connector in the first set of electrical connectors is electrically connected to a plurality of electrical connectors in the second set of electrical connectors, and at least one electrical connector in the second set of electrical connectors is electrically connected to a plurality of electrical connectors in the first set of electrical connectors.

Each of the first set of electrical connectors can be mounted in a respective cage that is attached to a front panel of an electronics rack. Each of the first set of electrical connectors can be removable from the respective cage without desoldering any component. Each of the first set of electrical connectors can be electrically connected to each of the second set of electrical connectors.

According to an embodiment of the present invention, a connector assembly includes a fixed connector configured to be rigidly attached to a substrate, a detachable connector that is configured to be mated and unmated with the fixed connector, and a cable permanently attached to the detachable connector. Either the fixed connector or the detachable connector is configured to mate and unmate with an interconnection module, and the detachable connector can be unmated without de-soldering.

The detachable connector can be configured to mate and unmate with the interconnection module, and the connector assembly can be configured to transport a first set of signals sequentially through the fixed connector and the detachable connector to the interconnect module and can be configured to transport a second set of signals from the cable to the interconnection module through the detachable connector.

The fixed connector can be configured to mate and unmate with the interconnection module, and the connector assembly can be configured to transport a first set of signals through the fixed connector to the interconnection module and can be configured to transport a second set of signals from the cable through the detachable connector and the fixed connector to the interconnection module.

The detachable connector can include a plurality of detachable connectors.

According to an embodiment, a cage assembly includes a cage with a front, a top wall, a bottom wall, and side walls and defining a cavity that is configured to receive an interconnection module. The top wall includes a top opening configured to receive a detachable connector, and the front including a front opening that is configured to receive the interconnection module in a module-mating direction.

The cage assembly can further include a rear, where the top opening can be positioned immediately adjacent to the rear. The cage assembly can further include a cover that extends over the top opening. The cage assembly can further include a detachable connector. The cover can be carried by the detachable connector. The top opening can be configured to receive the detachable connector in a direction that is not parallel to the module-mating direction. The cage assembly can further include a fixed connector inside and between the side walls of the cage. A back wall of the cage can be carried by the detachable connector. The detachable connector can be positioned inside and between the side walls of the cage. The detachable connector can physically connect to the interconnection module. The cage can include a first cutout at the top wall and a second cutout at the bottom wall or can include a first cutout at the top wall, a second cutout at the bottom wall, and a third cutout at the rear. The detachable connector can be positioned on top of the fixed connector. The detachable connector can carry one or more of power, control, or high-speed signals that equal or exceed a frequency of 20 GHz with less than-40 dB of frequency domain crosstalk. The fixed connector can carry one or more of power, control, or differential signals that equal or exceed a frequency of 20 GHz with less than-40 dB of frequency domain crosstalk. The fixed connector may not receive a mating paddle card.

According to an embodiment of the present invention, an interconnection system includes a cage that includes a first end and a second end opposed to the first end and that is configured to receive an interconnection module at the first end, and a detachable connector positioned at the second end of the cage. The detachable connector is permanently attached to electrical cables that are configured to transport high-speed signals, and the detachable connector includes an electrical connection that is configured to transports low-speed and power signals.

The interconnection system can further include a fixed connector mechanically connected to the detachable connector. The fixed connector can electrically connect with the electrical connection. The fixed connector may not be electrically connected to the detachable connector. The detachable connector can include a plurality of detachable connectors. Some of the detachable connectors can be configured to transport high-speed electrical signals, and some of the detachable connectors can be configured to transport low-speed signals. The electrical connection can mate with an interposer. The detachable connector can be configured to mate and unmate with the interconnection module.

The above and other features, elements, steps, configurations, characteristics, and advantages of the present invention will become more apparent from the following detailed description of embodiments of the present invention with reference to the attached drawings.

BRIEF DESCRIPTION OF THE DRAWINGS

FIGS. 1A and 1B show side and cross-sectional views of a known QSFP connector system.

FIG. 3 is a simplified side view of a portion of the detachable, cabled front-panel interconnection system shown in FIGS. 2A and 2B with a fixed connector mounted to a substrate and a detachable connector removed.

FIG. 4 is a side view of a portion of the detachable, cabled front-panel interconnection system shown in FIGS. 2A and 2B with the fixed connector mounted to the substrate and the detachable connector mated to the fixed connector.

FIG. 5C is a bottom perspective view of the detachable connector shown in FIG. 4.

FIGS. 9A to 9C show side and perspective views a front-panel electrical interconnection system according to a second modification of the third embodiment of the present invention.

FIGS. 12A to 18B show block diagrams of different possible arrangements of interconnection systems.

DETAILED DESCRIPTION OF EMBODIMENTS

Figure 1B:
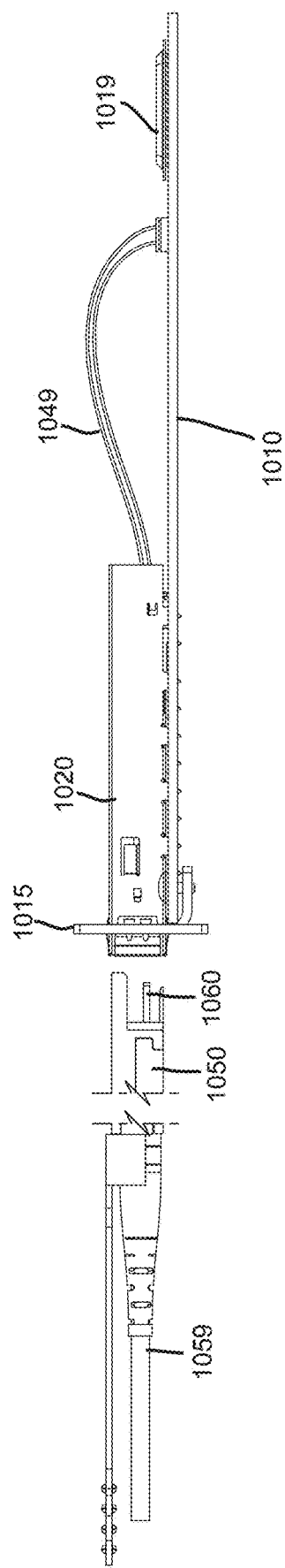

Embodiments of the present invention and modifications thereto, are described with reference to FIGS. 2A to 18B. With respect to these embodiments and modification thereto, certain devices, such as cables, contacts, connectors, etc., are described as being "high-speed" or "low-speed." These devices are designed to transport high-speed signals or low-speed signals, respectively. High-speed signals are generally currently defined as signals operating at data rates greater than approximately 1 Gb/s. The high-speed signals are generally used to transmit information between points on an optical link and can include differential signals or single-ended signals. Low-speed signals are generally defined as signals operating at data rates less than approximately 1 Gb/s. The low-speed signals can be at much lower data rates and include fixed power voltages. The low-speed signals can be used to control and power the optical link. It should be understood the cutoff frequency of 1 Gb/s can change over time.

It should be understood that "high-speed" devices may be reconfigured in some cases to transport low-speed signals and that "low-speed" devices may be reconfigured in some cases to transport high-speed signals. This may be accomplished, for example, by replacing elements of the devices (e.g., replacing low-speed contacts with high-speed contacts or replacing high-speed cables with low-speed cables).

FIGS. 12A to 18B show various arrangements of interconnection systems that are implemented as the specific embodiments shown in FIGS. 1A to 11B. The interconnection systems can mate and unmate with an interconnection module 150 and can be mounted to a substrate 110. FIGS. 12A, 13A, 14A, 15A, 16A, 17A, and 18A each show one of the interconnection systems and the interconnection module 150 mated together, and FIGS. 12B, 13B, 14B, 15B, 16B, 17B, and 18B each show the interconnection system and the interconnection module 150 unmated. In each of the interconnection systems, high-speed and low-speed signals are transported by the interconnection module 150 shown by the two lines connected to the interconnection module 150, and the high-speed signals and the low-speed signals are transported differently in the different arrangements using elements selected from a fixed connector 130, a detachable connector 140, high-speed cable 149A, low-speed cable 149B, and low-speed connection 135. Although not shown in FIGS. 12A to 18B, the high-speed cables 149A and/or the low-speed cables 149B can be terminated to the substrate 110 at a location that is not adjacent to the where the detachable connector 140 is located. Although only one cable is shown for each of the high-speed cables 149A and the low-speed cables 149B, it is possible that more than one cable is used and that each cable is terminated at a different location on the substrate 110.

Figure 15A:
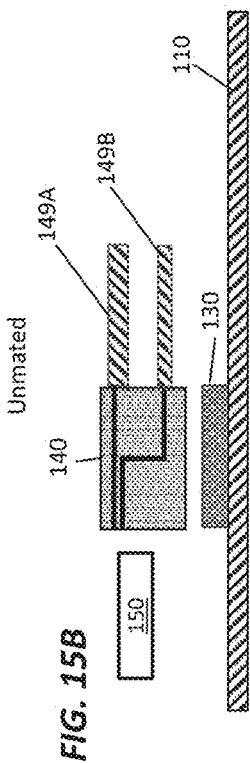
Figure 16A:
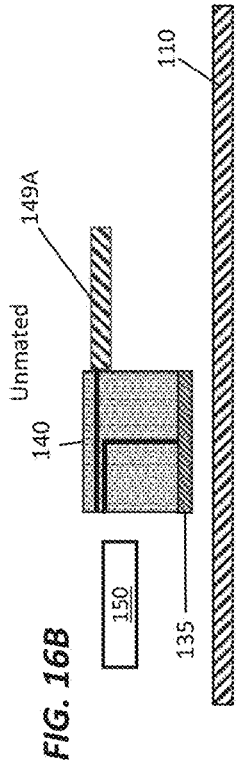
Figure 17A:
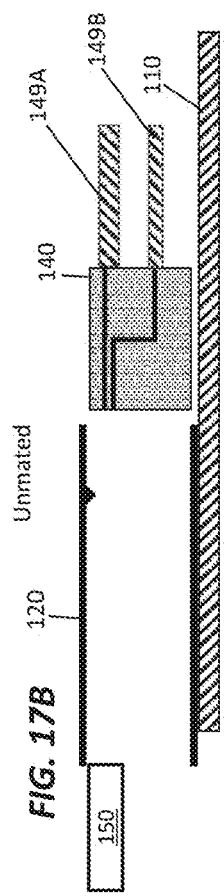
Figure 15B:
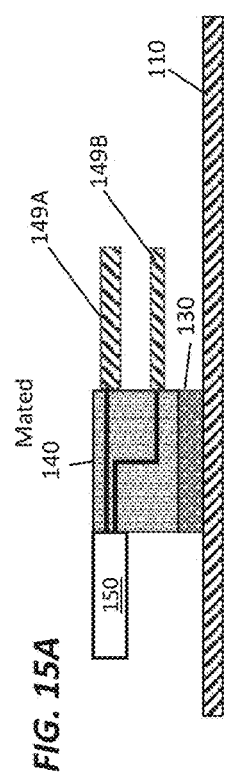
Figure 16B:
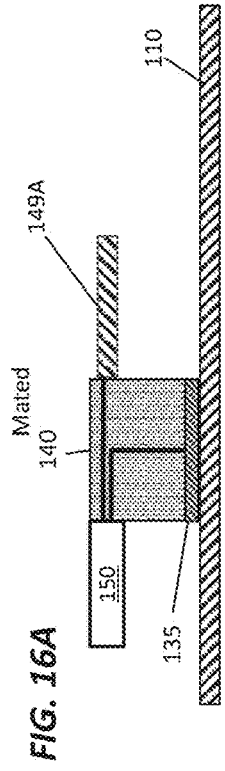
Figure 17B:
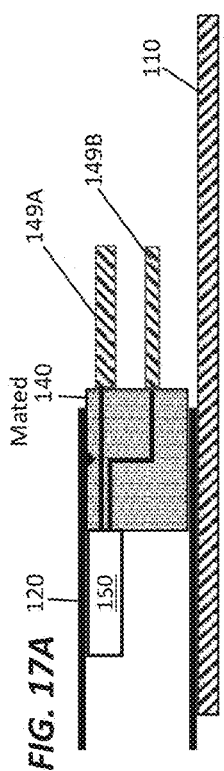
Figure 18A:
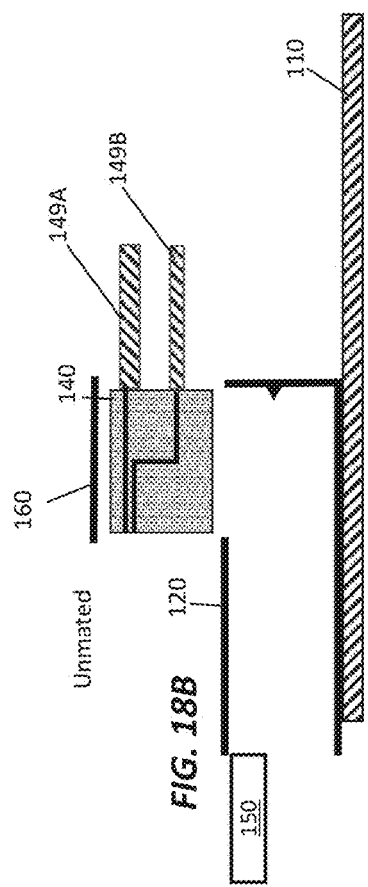
Figure 18B:
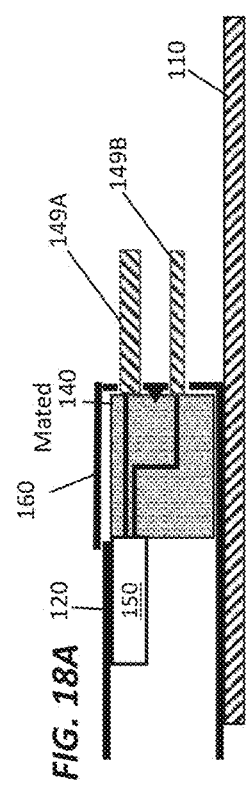

FIGS. 12A to 15B show that the interconnection system includes the fixed connector 130 and the detachable connector 140 that can mate and unmate with each other. FIGS. 16A and 16B show that, instead of including fixed connector 130, the interconnection system includes the low-speed connection 135 connected to the detachable connector 140. FIGS. 17A, to 18B show that, instead of including fixed connector 130, the interconnection system is connected to the substrate 110 by the cage 120. As shown in FIGS. 17A and 17B, the detachable connector 140 can be inserted into the rear of the cage 120 in a direction parallel or substantially parallel within manufacturing tolerances with the module-mating direction, and the top of the cage 120 can include a securing structure. As shown in FIGS. 18A and 18B, the detachable connector 140 can be inserted from the top of the cage 120 in a direction perpendicular or substantially perpendicular within manufacturing tolerances with the module-mating direction, and a side of the cage 120 can include a securing structure. It should be understood that the detachable connector 140 can be inserted into the cage 120 in any direction and that the securing structure(s) can be located on any surface(s) of the cage 120.

The substrate 110 can be any suitable substrate, including, for example, a printed circuit board (PCB).

The cage 120 can be any suitable cage. The cage 120 can include a single stamped metal sheet or can include multiple stamped metal sheets that are connected together. Although the cage 120 is only shown in FIGS. 17A to 18B, a cage can be included with any of the interconnection systems of FIGS. 12A to 16B. The cage 120 can include a cutout through which the detachable connector 140 can be inserted to be mated with the fixed connector 130, the substrate 110, or the cage 120. The cage 120 can include more than one cutout, and the cutouts can be located on any surface of the cage 120. After the detachable connector 140 is mated, a cover 122 (shown only in FIGS. 18A and 18B) can be used to cover the cutout. The cover 122 can be separate from the detachable connector 140 or can be included with or attached to the detachable connector 140. The cover 122 can help reduce EMI (electromagnetic interference) and can be made of, for example, metal or metal-covered plastic. As shown in FIGS. 17A and 17B, the cage 120 can include a rear cutout in the rear of the cage 120 through which the high-speed cables 149A and possibly the low-speed cables 149B can extend. The rear cutout can also be covered with a rear cover (not shown in FIGS. 12A to 18B). The rear cover can be made of, for example, metal or metal-covered plastic and can be separate from the detachable connector 140 or can be included with or attached to the detachable connector 140.

The fixed connector 130 can be any suitable connector that can be rigidly attached to the substrate 110, i.e., the fixed connector 130 does not float with respect to the substrate 110. The fixed connector can carry signals that are transported at a frequency equal to or exceeding 20 GHz or that are transported at a rate equal to or exceed 20 Gb/s with less than −40 dB of frequency domain crosstalk. The fixed connector does not receive a mating paddle card. FIGS. 12A to 14B show that the fixed connector 130 includes electrical connections. Although only one fixed connector 130 is shown in FIGS. 12A to 17B, any number of fixed connectors 130 can be used up to the number of detachable connectors 140 used. In FIGS. 12A, 12B, 14A, and 14B, the fixed connector 130 includes low-speed connections 135. The low-speed connection 135 can be any suitable connection, including, for example, flexible contact fingers of an interposer or more rigid electrical contacts of an electrical connector. In FIGS. 15A and 15B, the fixed connector 130 does not include any electrical connections but does provide a mechanical connection between the detachable connector 140 and the substrate 110. In FIGS. 12A to 15B, the detachable connector 140 mates with the fixed connector 130 in any suitable direction, including, for example, a direction parallel, substantially parallel within manufacturing tolerances, perpendicular, substantially perpendicular within manufacturing tolerances to the module-mating direction, or any direction between parallel and perpendicular to the module-mating direction.

The detachable connector 140 can be any suitable connector or connectors that at least can transport high-speed signals and that can possibly transport low-speed signals. The detachable connector 140 can carry signals that are transported at a frequency equal to or exceeding 20 GHz or that are transmitted at a rate equal to or exceed 20 Gb/s, with less than −40 dB of frequency domain crosstalk. The detachable connector 140 can be detached from the fixed connector 130 without damaging the detachable connector 140 or the fixed connector 130 and can be detached without desoldering. Although only one detachable connector 140 is shown in FIGS. 12A to 17B, any number of detachable connectors 140 can be used up to the number of separate cables in the high-speed cables 149A and possibly the low-speed cables 149B. If more than one detachable connector 140 is used, the detachable connectors 140 can mate with the fixed connector 130 in the same direction or in different directions. For example, if the detachable connector 140 includes a high-speed detachable connector and a low-speed detachable connector, then the high-speed detachable connector can mate with the fixed connector in a direction that is perpendicular or substantially perpendicular within manufacturing tolerances to the module-mating direction, and the low-speed detachable connector can mate with the fixed connector in a direction that is parallel or substantially parallel within manufacturing tolerances to the module-mating direction. The detachable connector 140 can be fixed or can float with respect to at least one of the substrate 110, the cage 120, or the fixed connector 130. The float direction can be perpendicular or substantially perpendicular within manufacturing tolerances to the module-insertion direction. The detachable connector 140 can be attached to the substrate 110 using a fastener, either directly to the substrate 110 or through an intermediate device (e.g., fixed connector 130, low-speed connection 135, cage 120). Any suitable fastener, including, for example, a bolt, a clip, a spring-loaded shaft, etc., can be used. The detachable connector 140 can mate with the fixed connector 130 in any suitable direction.

The high-speed cables 149A can include any suitable high-speed cables and can include the same or different types of cable, and the low-speed cables 149B can include any suitable low-speed cables and can include the same or different types of cables. For example, the high-speed cables 149A and the low-speed cables 149B can include twin axial cable, coaxial cable, twisted pair(s), and other types of electrical cables or electromagnetic waveguides.

The interconnection module 150 can be any suitable module, including, for example, an electrical module, an optical module, an electrical transceiver, an optical transceiver, or an active optical link and can be, for example, a QSFP or QSFP-double density (QSFP-DD) module. Additionally, the interconnection module 150 can be a transmitter with only transmit functionality or a receiver with only receive functionality. The interconnection module 150 can be mated and unmated with a front-panel interconnection system.

FIGS. 12A and 12B show the fixed connector 130 attached to the substrate 110 and the detachable connector 140 attached to the fixed connector 130. The low-speed signals can be transported to and from the substrate 110 through the low-speed connection 135 of the fixed connector 130. The high-speed signals can be transported to and from the high-speed cables 149A through the fixed connector 130 and the detachable connector 140.

FIGS. 13A and 13B show the fixed connector 130 attached to the substrate 110 and the detachable connector 140 attached to the fixed connector 130. Instead of the low-speed signals being transported to and from the substrate 110 through the low-speed connection 135 of the fixed connector 130, the low-speed signals can be transported to and from the low-speed cables 149B through the fixed connector 130 and the detachable connector 140. The high-speed signals can be transported to and from the high-speed cables 149A through the fixed connector 130 and the detachable connector 140.

FIGS. 14A and 14B show the fixed connector 130 attached to the substrate 110 and the detachable connector 140 attached to the fixed connector 130. The low-speed signals can be transported to and from the substrate 110 through the low-speed connection 135 of the fixed connector 130. The high-speed signals can be transported to and from the high-speed cables 149A, but instead of being transported by the fixed connector 130, the high-speed signal cables can only be transported by the detachable connector 140.

FIGS. 15A and 15B show the fixed connector 130 attached to the substrate 110 and the detachable connector 140 attached to the fixed connector 130. Instead of the low-speed signals being transported by the fixed connector 130, the low-speed signals can be transported to and from the low-speed cables 149B only by the detachable connector 140. The high-speed signals can be transported to and from the high-speed cables 149A only through the detachable connector 140.

FIGS. 16A and 16B do not include the fixed connector 130, instead including the low-speed connection 135 connected to the detachable connector 140. Instead of the low-speed signals being transported by the fixed connector 130 or the low-speed cables 149B, the low-speed signals can transported to and from the substrate 110 by the detachable connector 140 and the low-speed connection 135. The high-speed signals can be transported to and from the high-speed cables 149A only by the detachable connector 140.

FIGS. 17A to 18B do not include the fixed connector 130 or the low-speed connection 135, instead including the low-speed cable 149B connected to the detachable connector 140 and instead being connected to substrate 110 by the cage 120. The low-speed signals can be transported to and from the low-speed cable 149B by the detachable connector 140 and the low-speed connection 135. The high-speed signals can be transported to and from the high-speed cables 149A only by the detachable connector 140.

Figure 2A:
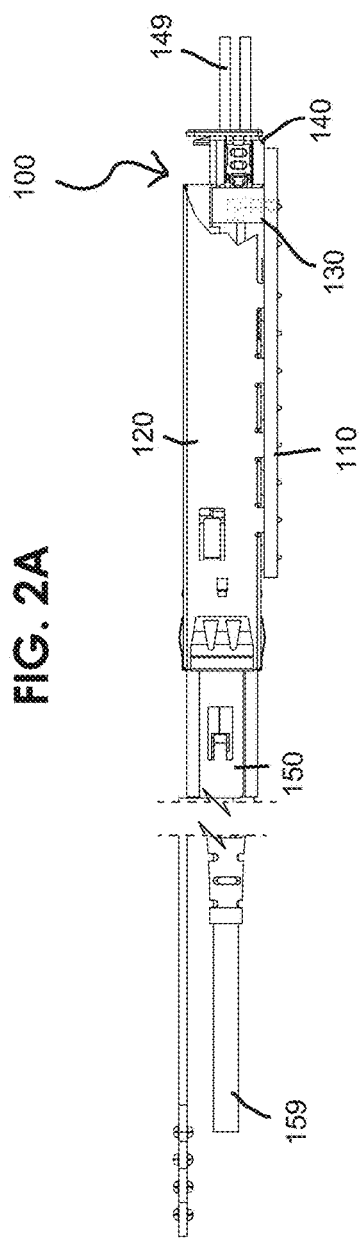
FIGS. 2A and 2B show side and perspective views of a detachable, cabled front-panel interconnection system according to a first embodiment of the present invention.
Figure 2B:
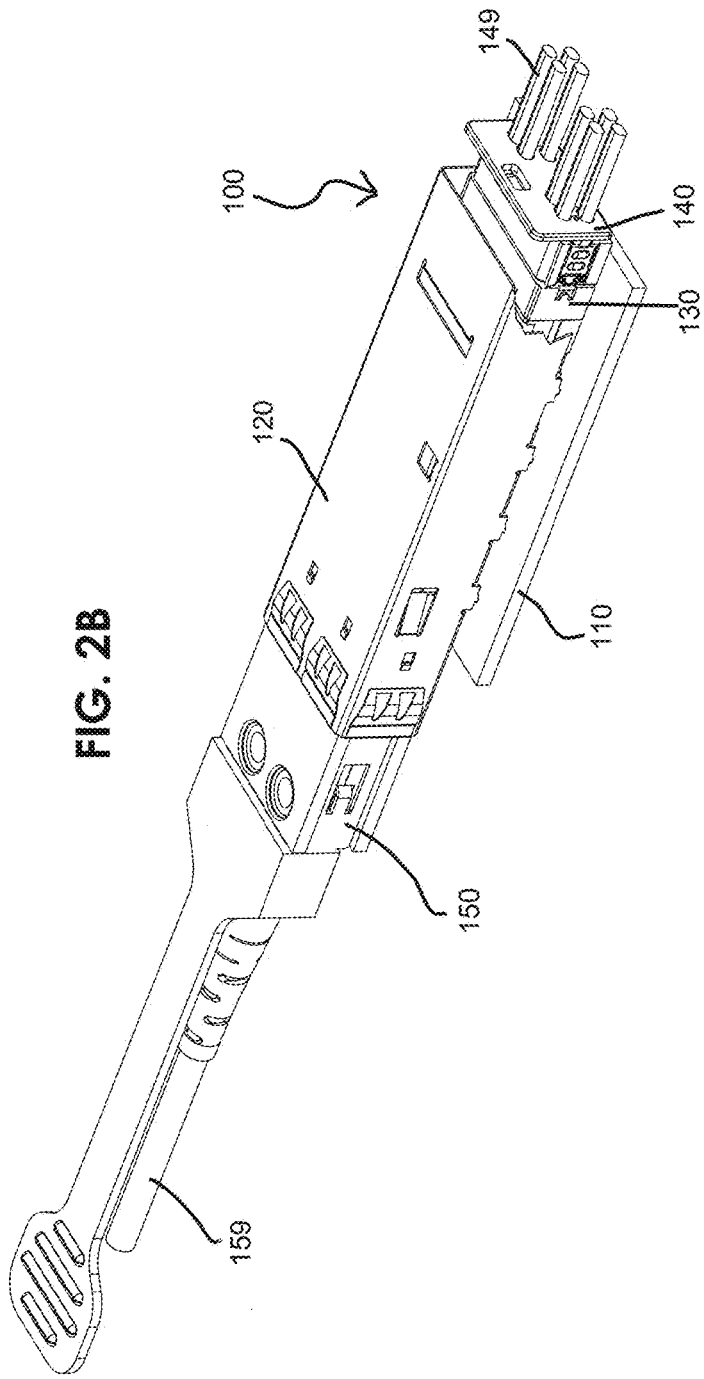
Figure 5A:
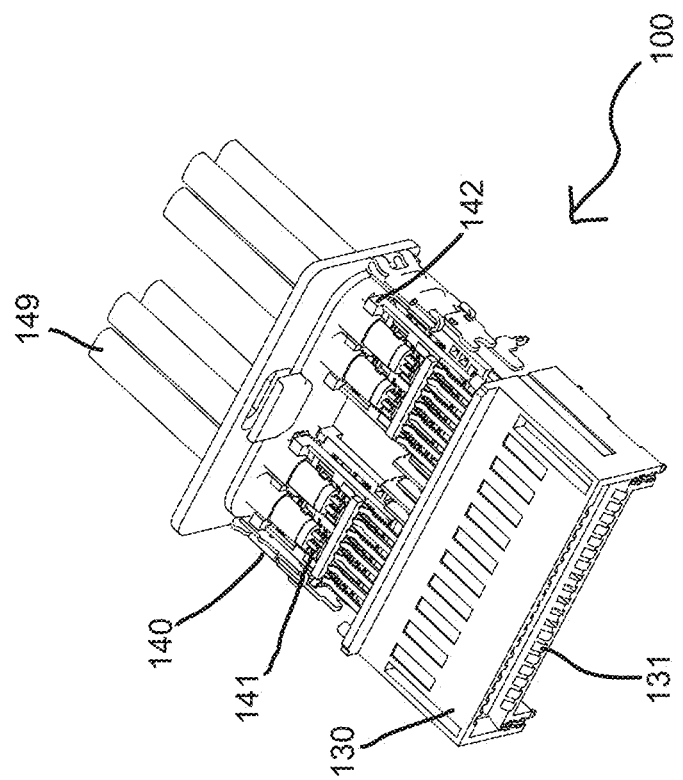
FIGS. 5A and 5B are perspective views of the fixed connector and the detachable connector of the connector shown in FIG. 4.
Figure 5B:
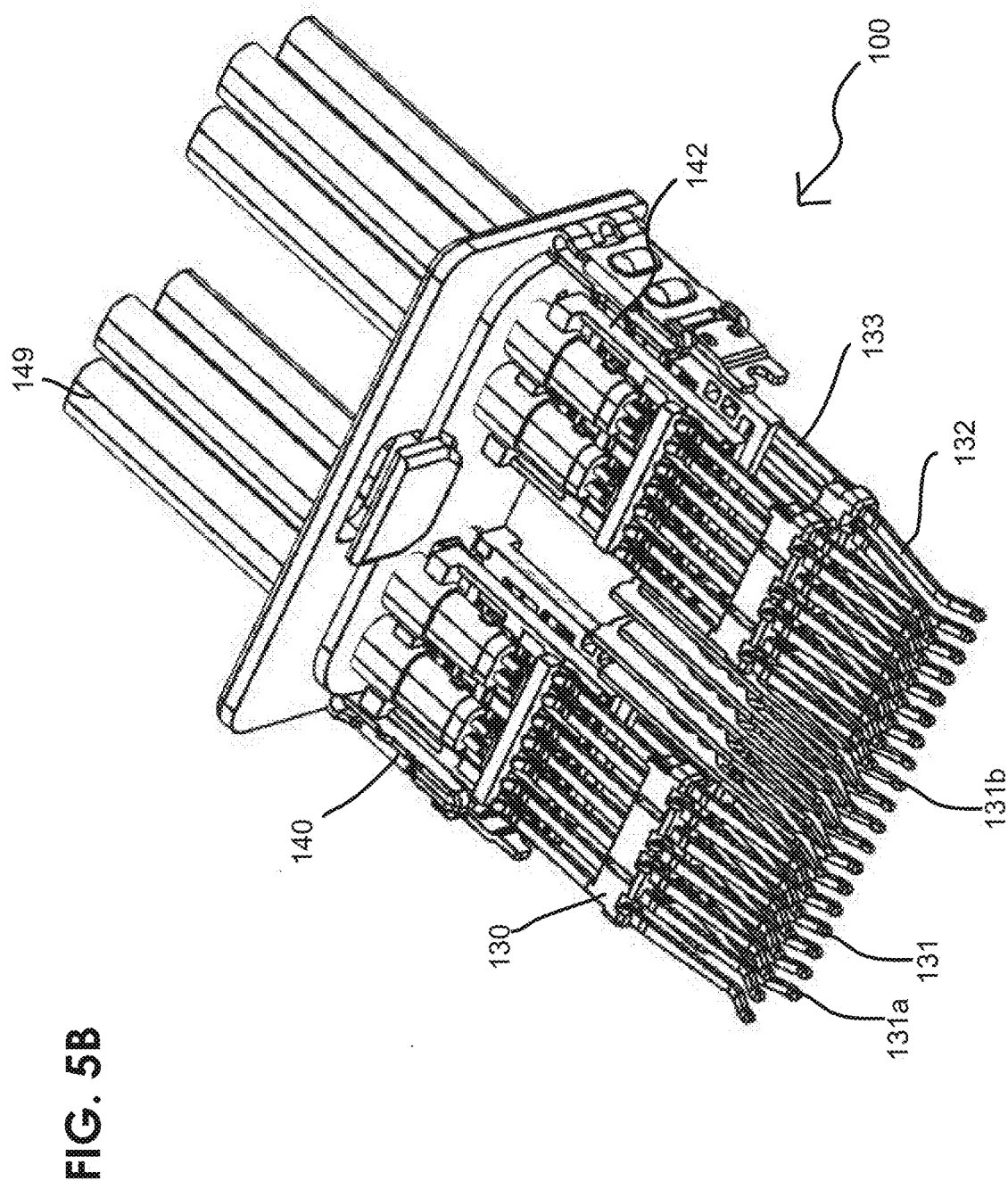

FIGS. 2A to 5B show a front-panel electrical interconnection system according to a first embodiment of the present invention, which can be an implementation of the interconnection system of FIGS. 12A and 12B. FIG. 2A shows a side view of an interconnection module 150 mated with a front-panel interconnection system that includes an electrical connector 100 with a fixed connector 130 and a detachable connector 140. FIG. 2B shows a perspective view of the interconnection module 150 mated with the electrical connector 100. FIG. 3 is a simplified side view of the fixed connector 130 mounted to a host printed circuit board (PCB) or substrate 110. FIG. 4 is a side view of the fixed connector 130 mounted to the substrate 110 with the detachable connector 140 connected to the fixed connector 130. FIGS. 5A and 5B are a perspective view of the detachable connector 140 connected to the fixed connector 130.

The interconnection module 150 may be, for example, an electrical module, an optical module, an electrical transceiver, an optical transceiver, or an active optical link and may be, for example, a QSFP or QSFP-double density (QSFP-DD) module. Additionally, the interconnection module 150 may be a transmitter, having only transmit functionality, or a receiver, having only receive functionality. The interconnection module 150 can be mated and unmated with the front-panel interconnection system. High-speed cable 159 can be connected to the outboard side of the interconnection module 150. High-speed cable 159 may be optical or electrical and may transport high-speed signals to and from the electrical connector 100 of the interconnection system. High-speed cables 159 can also be used to transport low-speed signals, including control and power signals. An interior or inboard side of the interconnection module 150 may include a card-edge 160 with contact pads that are arranged to mate and unmate with the electrical connector 100. The electrical connector 100 may be, for example, a receptacle connector.

The electrical connector 100 may be at least partially provided in a cage 120 and can be split into a fixed connector 130 and a detachable connector 140 that each include a respective housing and respective electrical contacts. The fixed connector 130 may be rigidly attached to the substrate 110, i.e., the fixed connector 130 does not float with respect to the substrate 110. The fixed connector 130 may be mounted to the substrate 110 using various methods. The fixed connector 130 may be mounted with a SMT (surface mount technology) process, mounted by soldering with a mix of SMT and through hole mounting, or mounted by press-fit contacts to the substrate 110. For example, as shown in FIG. 2A, the fixed connector 130 can include low-speed contacts that can be press-fit contacts that are shown with dashed lines. The low-speed contacts can be reconfigured to transport high-speed signals. Accordingly, press-fit contacts or SMT pads can provide an electrical connection for power and control signals between the electrical connector 100 and the substrate 110. Weld tabs 235, for example, as shown in FIGS. 6B, may also be used to secure the fixed connector 130 to the substrate 110. The weld tabs 235 can be press-fit mechanical anchors. Alternatively, the interconnection between the fixed connector 130 and the detachable connector 140 may allow a portion or all of the detachable connector 140 to move vertically during normal operation, i.e., a portion of or the entire detachable connector 140 vertically floats, without losing electrical continuity. One or more electrical components 119 may be mounted to the substrate 110 at various location(s) outside of the keep-out area needed to mate and unmate the detachable connector 140. The one or more electrical components 119 may include active components such as field-programmable gate arrays (FPGA), microprocessors, microcontrollers, and the like, as well as passive components, such as resistors, capacitors, inductors, and the like. The electrical components 119 may be adjacent to or in a vicinity the fixed connector 130 or they may be remote from the fixed connector 130. The electrical components 119 may include integrated circuits (IC) that are housed in an IC package.

The fixed connector 130 can be structured to withstand solder reflow temperatures and does not include any electrical cables. Accordingly, the fixed connector 130 and any components mounted on the substrate 110 that are adjacent to or in a vicinity of the fixed connector 130 can be soldered without damaging an electrical cable or the like. The detachable connector 140 may include electrical cables 149 that are permanently attached, for example, by soldering, on an inboard side of the detachable connector 140. The electrical cables 149 may be, for example, a twin axial cable, a coaxial cable, or a twisted pair, but other types of electrical cables or electromagnetic waveguides may be included. In addition, a combination of different types of electrical cables, for example, a combination of twin axial and coax cables, may be provided.

FIG. 3 is a side view of the fixed connector 130 mounted to the substrate 110. The cage 120 and the detachable connector 140 are not shown in FIG. 3. The fixed connector 130 may be mounted to the substrate 110 in the same assembly step or in a different assembly step as the other electrical components 119 mounted on the substrate 110.

The detachable connector 140, which includes electrical cables 149, does not have to be present during the mounting process and is not shown in FIG. 3. Accordingly, solder reflow may be used to mount components, including the fixed connector 130 and the other electrical components 119, to the substrate 110 without damaging the electrical cables 149 attached to the detachable connector 140.

After the substrate 110 is populated with electrical components, including the fixed connector 130 and the other electrical components 119, the detachable connector 140 may be mated with the fixed connector 130. FIG. 4 shows the detachable connector 140 mated with the fixed connector 130. A latching mechanism, for example, may secure the detachable connector 140 to the fixed connector once the fixed connector 130 and the detachable connector 140 are mated together. Any suitable latching mechanism can be used. The latching mechanism may be located on a top surface or any side surface of the electrical connector 100. For example, FIG. 4 shows a latch receptacle 134 press fit into the housing of the fixed connector 130 and a latch 144 connected to the detachable connector 140. The latch 144 can include fingers that engage with holes in the latch receptacle 134. The latch 144 can biased such that the fingers engage the holes in the latch receptacle 134 when the detachable connector 140 is mated with the fixed connector 130. The latch 144 can be depressed to disengage the latch 144 from the latch receptacle 134 when the detachable connector 140 is unmated with the fixed connector 130. The detachable connector 140 may be mated and unmated with the fixed connector 130 multiple times. For example, the detachable connector 140 can be mated and unmated from the fixed connector 130 without performing desoldering or the like. It is also possible to not include a latching mechanism.

The detachable connector 140 may be provided with different structures. The first embodiment includes a detachable, cabled front-panel connector, as shown in FIGS. 5A and 5B. In FIGS. 5A and 5B, portions of the housings of the fixed connector 130 and the detachable connector 140 are not shown. The fixed connector 130 includes electrical contacts 131 arranged across a width of the fixed connector 130. The electrical contacts 131 of the fixed connector 130 may be provided in one or more rows of contacts. The contacts can have equal or substantially equal spacing between them or the spacing and geometry of adjacent contacts can be different to accommodate different functions or other properties. As shown in FIG. 5B, some of electrical contacts 131 may be a cable contact 131a that can include a module contact beam 132 that connects to corresponding contacts of an interconnection module, e.g., QSFP module or the like, and a detachable-connector contact beam 133 that connects to corresponding contacts 141 of the detachable connector 140. The detachable connector 140 can include a frame 142 that holds the electrical cables 149 and contacts 141, and the center conductor(s) of the electrical cables 149 can be soldered to the contacts 141. As shown in FIG. 5B, some of the electrical contacts 131 of the fixed connector 130 can be a substrate contacts 131b that can be electrically and physically connected with the substrate 110 (substrate 110 is not shown in FIG. 5B). Each electrical contact 131 of the fixed connector 130 may be defined by a single piece of formed sheet metal. The electrical contact 131 can be formed, for example, by stamping a metal sheet.

Instead of the low-speed signals, including control and power signals, being transported from the interconnection module 150 to the substrate 110 through the fixed connector 130, the low-speed signals can be transported from the interconnection module 150 to the detachable connector 140 and be further transmitted to the electrical cables 149.

Figure 6A:
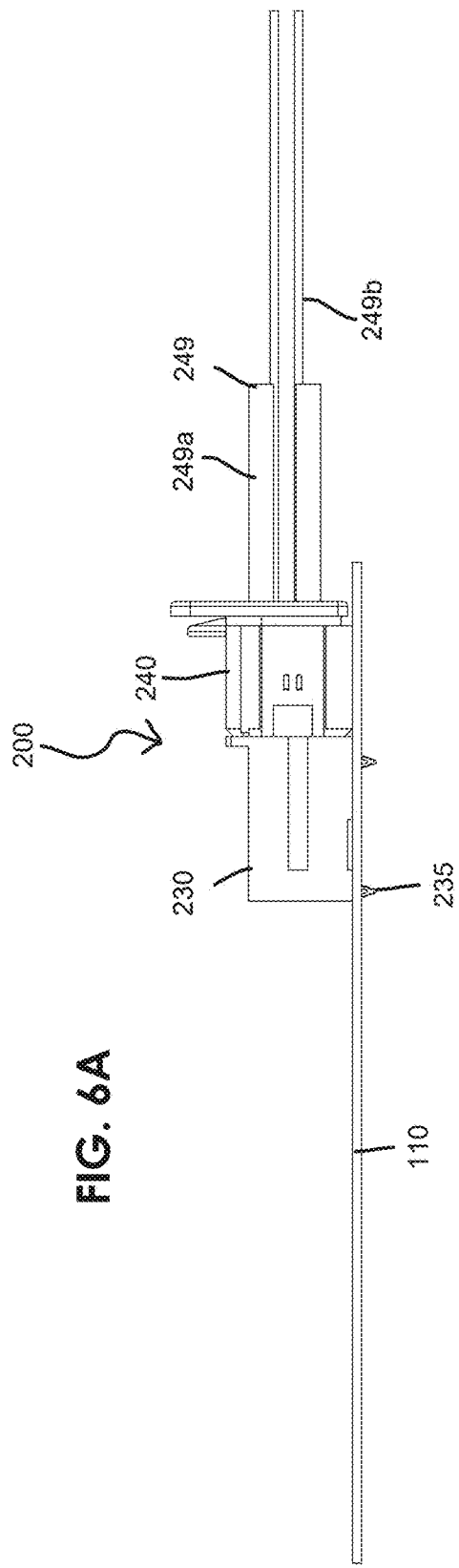
FIG. 6A is a side view of a front-panel electrical interconnection system according to a second embodiment of the present invention.
Figure 6B:
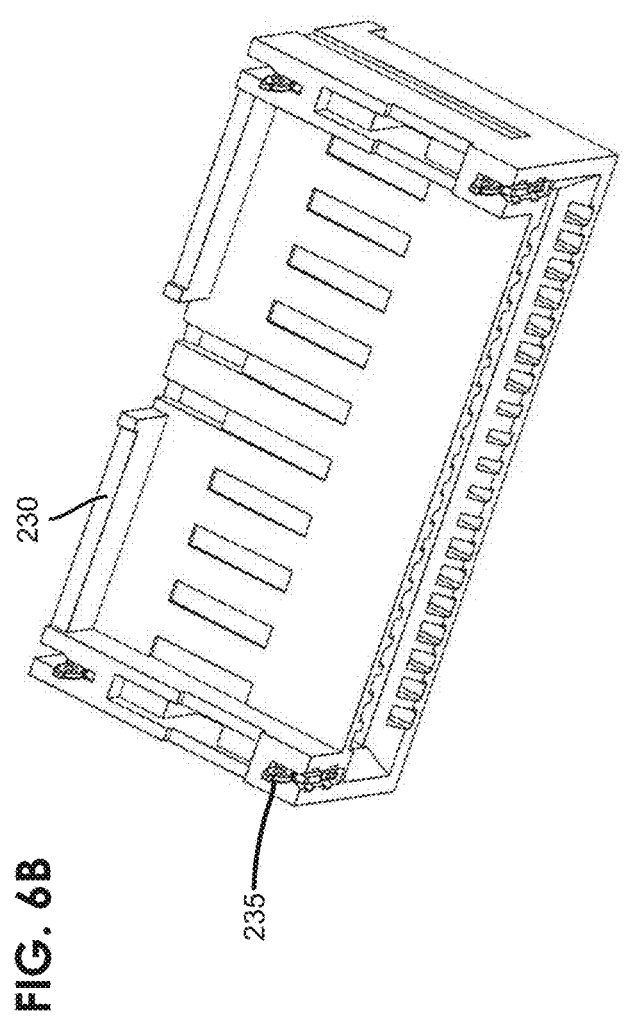
FIG. 6B is a bottom perspective view of the fixed connector shown in FIG. 6A
Figure 7:
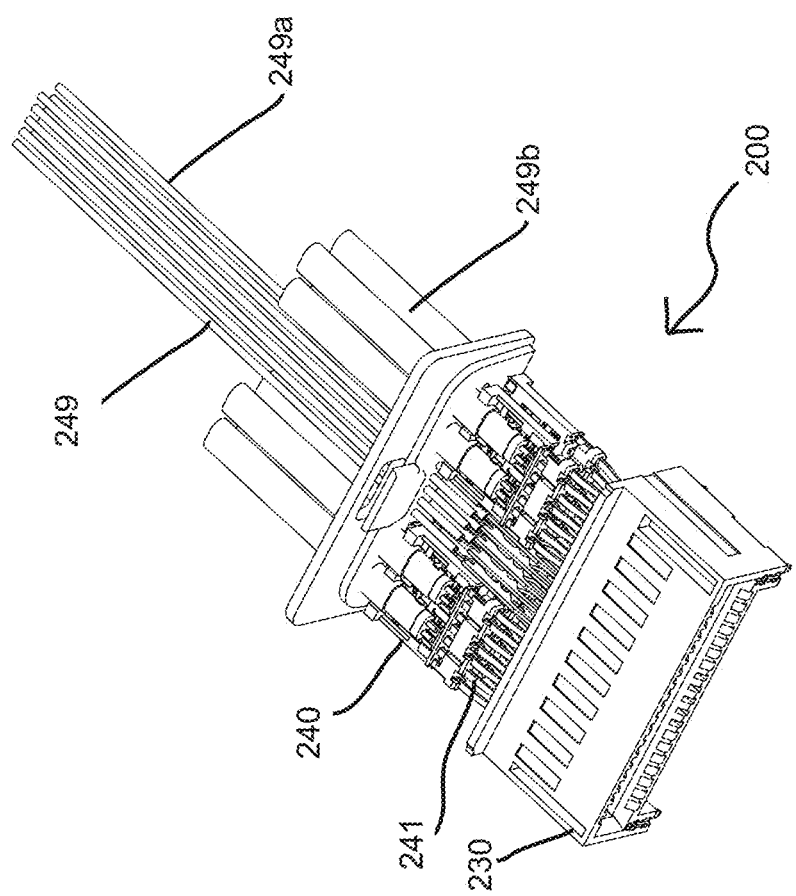
FIG. 7 is a perspective view of the fixed connector and detachable connector of the detachable, cabled front-panel connector shown in FIG. 6A.

FIGS. 6A, 6B, and 7 show side and perspective views of a second embodiment of the present invention, in which all electrical connections between the substrate 110 and an electrical connector 200 are provided by a flexible electrical connection, for example, an electrical cable, which can be an implementation similar to the interconnection system of FIGS. 15A and 15B but in which the electrical connections, i.e., contacts 241, of the detachable connector 240 are physically supported by the fixed connector 230. Instead of including press fit contacts or SMT pads to provide low-speed, including power and control signal, connections between an electrical connector and a substrate, as may be provided by the electrical connector 100 of the first embodiment, an electrical cable may transport power and control signals. Electrical cables 249 can include high-speed cables 249a that receive and transmit high-speed signals and low-speed cables 249b that receive and transmit low-speed signals, e.g., control signals and/or power. In the second embodiment, the fixed connector 230 may include no electrical connections to or from substrate 110, as shown in the bottom perspective view of the fixed connector 230. That is, the fixed connector 230 may be provided only to mechanically secure the detachable connector 240 to the substrate 110. The fixed connector 230 may be secured to the substrate 110 with weld tabs 235, as shown in FIG. 6B, or by another physical connection.

The detachable connector 240 may be mated and unmated to the fixed connector 230 by moving the detachable connector 240 closer to (mating) and farther from (unmating) the fixed connector 230, i.e., in a direction parallel or substantially parallel within manufacturing tolerances to a mating and unmating direction of the interconnection module 150. Alternatively, the fixed connector 230 and detachable connector 240 could be designed to mate and unmate in any direction, including from a direction parallel to the substrate 110 to a direction normal to the substrate 110.

The electrical connector 200 of the second embodiment can be shorter, i.e., with a reduced dimension in the mating-and-unmating direction of the interconnection module 150 and the electrical connector 200, when compared with the electrical connector 100 of the first embodiment. The electrical connector 200 is also able to provide the detachable connector 240 with increased flexibility, particularly where the fixed connector 230 and the detachable connector 240 connect to each other. For example, the detachable connector 240 of the second embodiment may be arranged to be detached closer to the substrate 110 than the detachable connector 140 of the first embodiment.

In the detachable connector 240 of the second embodiment, the electrical cables 249 include high-speed cables 249a and low-speed cables 249b. The center conductor(s) of the high-speed cables 249a and the low-speed cables 249b may be directly and permanently connected to contacts 241, e.g, The center conductor(s) of the high-speed cables 249a and the low-speed cables 249b may be directly soldered to the contacts 241. The contacts 241 are arranged to connect to corresponding contacts of an interconnection module, e.g., the contacts can connect to an edge card of a QSFP module or the like. By directly connecting the electrical cables 249 to the contacts 241, the electrical connector 200 of the second embodiment may have a lower total number of contacts when compared to the electrical connector 100 of the first embodiment. In addition, since a single contact 241 of the second embodiment is able to be in contact with both the electrical cables 249 and the interconnection module 150, significantly improved signal integrity may be provided because electrical signals do not pass through an additional set of contacts, for example, the electrical contacts 131 of the fixed connector 130 of the first embodiment. Furthermore, by reducing the total number of mateable and unmateable electrical contacts, insertion loss may also be significantly reduced.

FIG. 7 is a perspective view of the detachable connector 240 of the second embodiment. The electrical cables 249 extend from an inboard side of the detachable connector 240, and each electrical cable 249 may include one or more center conductors. The center conductor(s) of the electrical cables 249 may be directly attached to the contacts 241 or other electrical contacts by solder or the like. In addition, no intervening circuit board or frame is included to provide an electrical connection between the center conductor(s) of the electrical cables 249 and the contacts 241 or other electrical contacts. The contacts 241 or other electrical contacts may include a module contact beam that is able to mate with an edge card or the like of the interconnection module 150. In the second embodiment, only one mateable and unmateable interface is provided in the electrical path between the interconnection module 150 and the electrical cables 249. Accordingly, the electrical connector 200 of the second embodiment may provide significantly improved signal integrity and significantly reduced insertion loss when compared with electrical connectors that have two mateable and unmateable interfaces between an interconnection module and electrical cables. As shown in FIG. 7, the fixed connector 230 can physically support the module contact beams of the contacts 241. However, other arrangements are also possible, including, for example, the arrangement of FIGS. 15A and 15B in which the fixed connector 130 only directly supports the detachable connector 140.

Figure 8A:
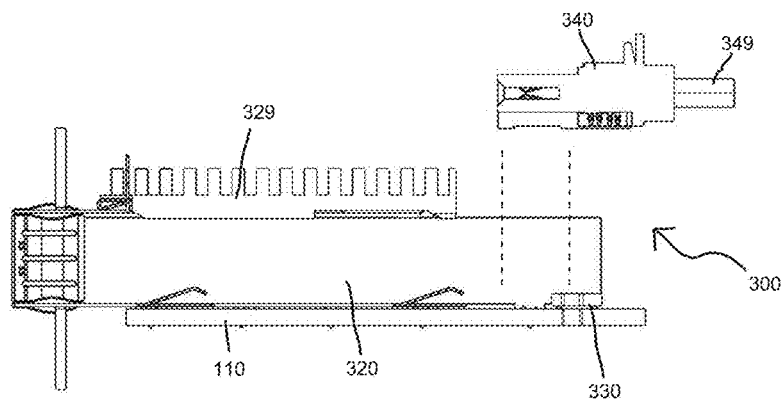
FIGS. 8A and 8B are cross-sectional and perspective views of a front-panel electrical interconnection system according to a third embodiment of the present invention.
Figure 8B:
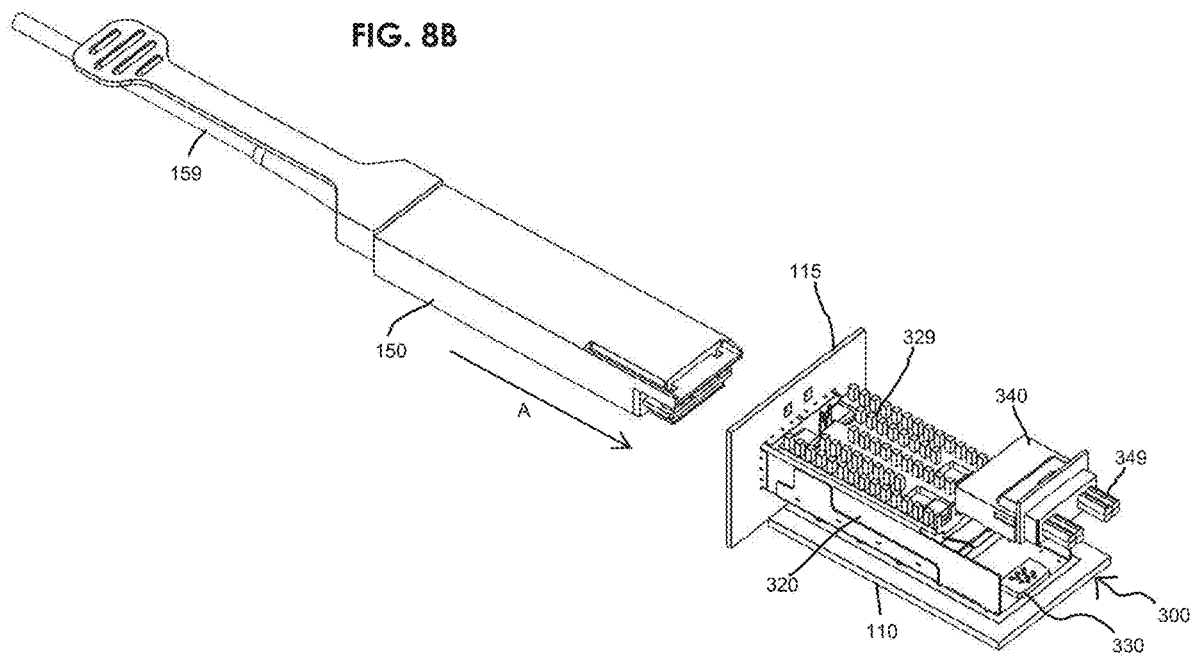

FIGS. 8A and 8b are cross-sectional and perspective views of an electrical connector 300 according to a third embodiment of the present invention, which can be an implementation of the interconnection system of FIGS. 14A and 14B. In the third embodiment, the fixed connector 330 at least partially includes direct rigid electrical connections to the substrate 110, similar to the first embodiment. However, in contrast to the first embodiment, the module card-edge 160 mates directly with the detachable connector 340. An electrical connection between both the high- and low-speed signals is directly established between the interconnection module 150 and the detachable connector 340. The detachable connector 340 transports the high-speed signals to the electrical cables 349 and the low-speed and power signals to the fixed connector 330. The fixed connector 330 of the third embodiment may therefore include no high-speed electrical contacts. The high-speed electrical contacts of the detachable connector 340 may be directly connected to the center conductor(s) of the electrical cables 349 of the detachable connector 340. The detachable connector 340 with the electrical cables 349 connects directly to the interconnection module 150. The detachable connector 340 mates and unmates with the interconnection module 150 in the module-mating direction A, and a high-speed electrical signal only passes through a single mateable/unmateable interface between the detachable connector 340 and the interconnection module 150. The fixed connector 330 may be a low-speed connector mounted to the substrate 110.

The fixed connector 330 shown in FIGS. 8A and 8B may connect low-speed signals to the detachable connector 340. In addition, the fixed connector 330 may provide mechanical structure(s) that engage with and attach to the detachable connector 340. The detachable connector 340 may be mated and unmated to the fixed connector 330 by moving the detachable connector 340 closer to (mating) and farther from (unmating) the substrate 110, i.e., in a direction perpendicular or substantially perpendicular within manufacturing tolerances to a mating and unmating direction of the interconnection module 150. Alternatively, the fixed connector 330 and detachable connector 340 could be designed to mate and unmate in any direction, including from a parallel direction to the substrate 110 to a normal direction to the substrate 110. A cage 320 may be included, and a tool may be used to mate and/or unmate the detachable connector 340 to the fixed connector 330. The cage 320 can have a cutout that allows the detachable connector 340 to be mated and unmated with the fixed connector 330. A cover (not shown) can be used to cover the cutout after the detachable connector 340 is mated with the fixed connector 330 to reduce EMI (electromagnetic interference). The cover can be separate from the detachable connector 340 or can be attached to and be a part of the detachable connector 340 such that the cover covers the cutout when the detachable connector 340 is mated with the fixed connector 330. The cover can provide a latching mechanism to secure the detachable connector 340 within the cage 320. Although a latching mechanism can be used, a latching mechanism may not necessary because the mechanical connection between the fixed connector 330 and the detachable connector 340 can secure the detachable connector 340 when the interconnection module 150 is mated and unmated with the detachable connector 340.

FIGS. 8A and 8B show an optional heatsink 329 may be provided on the cage 320. Any suitable heat dissipating device can be used. The other embodiments can also include a heatsink or any other suitable heat dissipating device.

Figure 8C:
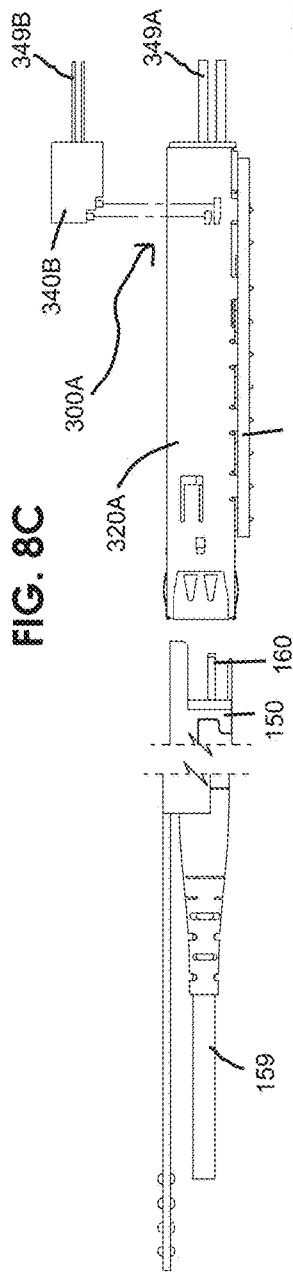
FIGS. 8C to 8E show side and perspective views of a front-panel electrical interconnection system according to a first modification of the third embodiment of the present invention.
Figure 8D:
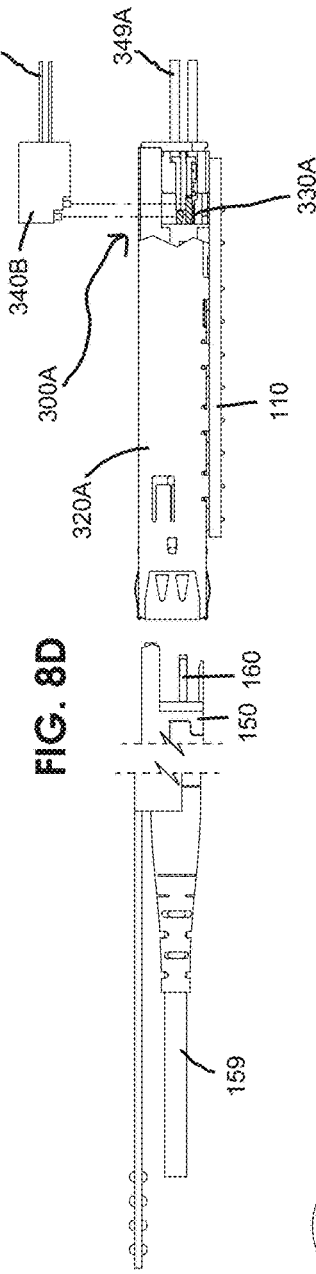
Figure 8E:
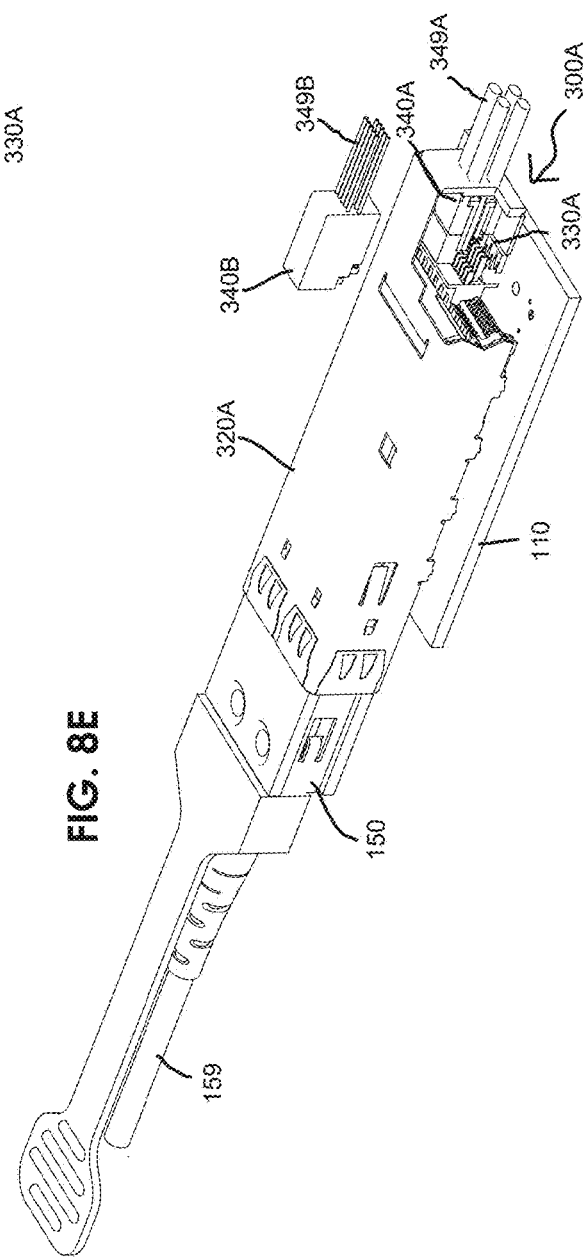

FIGS. 8C to 8E show a first modification of the third embodiment shown in FIGS. 8A and 8B in which the detachable connector includes a high-speed detachable connector 340A connected to high-speed cables 349A and a low-speed detachable connector 340B connected to low-speed cables 349B, which can be an implementation similar to the interconnection system of FIGS. 14A and 14B but in which the detachable connector include detachable connectors 340A and 340B. Although a single detachable connector 340A and a single detachable connector 340B are shown in FIGS. 8C to 8E, any number of detachable connectors 340A and 340B can be used (up to the number of individual cables in the high-speed cables 349A and the low-speed cables 349B), which can mate and unmate with a common body or directly to the fixed connector 330A. In the first modification shown in FIGS. 8C to 8E, the detachable connector 340A may be mated and unmated to the fixed connector 330A by moving the detachable connector 340A closer to (mating) and farther from (unmating) the fixed connector 330A, i.e., in a direction perpendicular or substantially perpendicular within manufacturing tolerances to the mating-direction of the interconnection module 150. The detachable connector 340B may be mated and unmated to the fixed connector 330A by moving the detachable connector 340B closer to (mating) and farther from (unmating) the substrate 110, i.e., in a direction perpendicular or substantially perpendicular within manufacturing tolerances to the mating-direction of the interconnection module 150. Although the detachable connectors 340A and 340B are mated and unmated with the fixed connector 330A in different directions in FIGS. 8C to 8E, the detachable connectors 340A and 340B can be mated and unmated with the fixed connector 330A in the same direction, e.g., in a direction perpendicular or in a direction parallel to the mating-direction of the interconnection module 150. A cage 320A may include a cutout to receive the detachable connector 340B. The cutout can be large enough to allow both the detachable connectors 340A and 340B to be attached in a direction perpendicular or substantially perpendicular to the mating-direction of the interconnection module 150. A cover (not shown) can be used to cover the cutout after the detachable connector(s) 340A and/or 340B are mated with the fixed connector 330A to reduce EMI. The cover can be separate from the detachable connectors 340A and 340B or can be attached to and be a part of the detachable connector(s) 340A and/or 340B such that the cover covers the cutout when the detachable connectors 340A and 340B are mated with the fixed connector 330A. The cover can provide a latching mechanism to secure the detachable connectors 340A and 340B within the cage 320A.

FIGS. 9A to 9C show a second modification of the third embodiment shown in FIGS. 8A and 8B in which the detachable connector includes a high-speed detachable connector 340C connected to high-speed cables 349C and low-speed detachable connector 340D connected to low-speed cables 349D, which can be an implementation similar to the interconnection system of FIGS. 13A and 13B but in which the detachable connector includes a high-speed detachable connector 340C and a low-speed detachable connector 340D. As shown in FIGS. 9A and 9B, a low-speed detachable connector 340D can be mated with the fixed connector 330C first and then the high-speed detachable connector 340C can be mated with the fixed connector 330C. Alternatively, a high-speed detachable connector 340C can be mated with the fixed connector 330C first and then the low-speed detachable 340D can be mated with the fixed connector 330C. Additionally, a high-speed detachable connector 340C and a low-speed detachable connector 340D can be mated together and then mated with the fixed connector 330C.

Although the high-speed detachable connector 340C and the low-speed detachable connector 340D are shown as separate connectors in FIGS. 9A to 9C, the high-speed detachable connector 340C and the low-speed detachable connector 340D can be a single connector. In the modification shown in FIGS. 9A to 9C, the fixed connector 330C and the detachable connectors 340C and 340D mate and unmate along a direction parallel or substantially parallel within manufacturing tolerances to the mating and unmating direction of the interconnection module 150. This direction is also parallel or substantially parallel to the top surface of the substrate 110 where the fixed connector 330C is mounted. Accordingly, the modification shown in FIGS. 9A to 9C is able to significantly reduce or prevent mechanical interference with the cage 320C when mating and unmating the high-speed detachable connector 340C to and from the fixed connector 330C. However, the mating and unmating direction between the fixed connector 330C and high-speed detachable connector 340C may be provided in any direction. That is, the fixed connector 330C and detachable connectors 340C and 340D may be modified to provide any mating and unmating direction. The electrical connector 300C may include high-speed cables 349C and low-speed cables 349D that are similar to the high-speed cables 349A and the low-speed cables 349B the first modification of the third embodiment.

Although a single high-speed detachable connector 340C and a single low-speed detachable connector 340D are shown in FIGS. 9A to 9C, any number of detachable connectors 340C and 340D can be used (up to the number of individual cables in the high-speed cables 349C and the low-speed cables 349D), which can mate and unmate with a common body or directly to the fixed connector 330C.

Figure 10A:
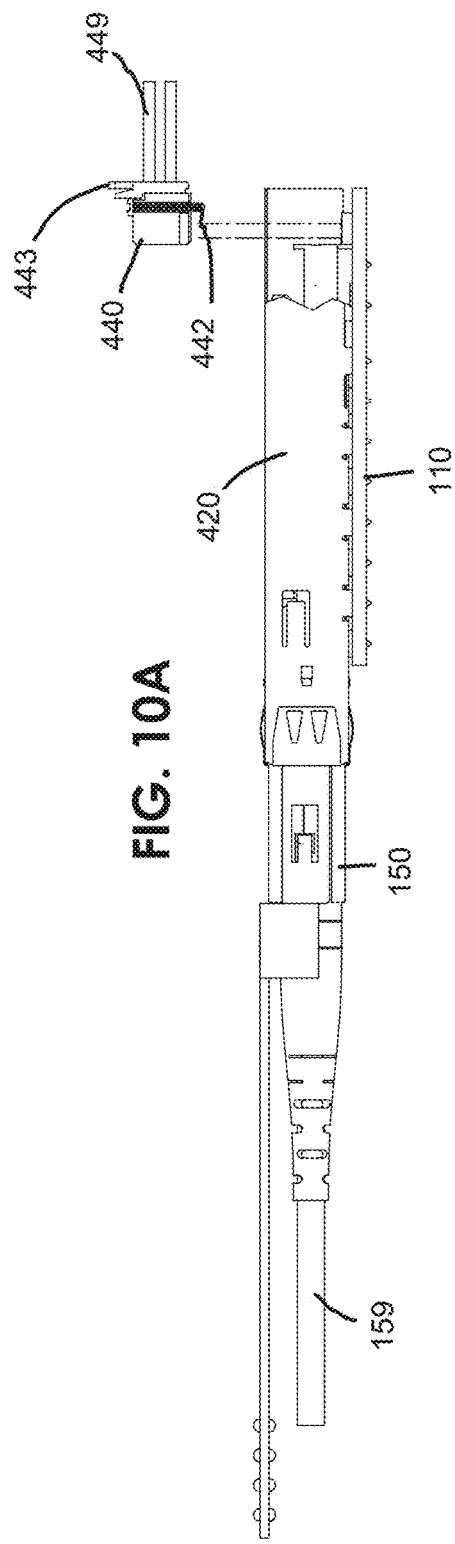
FIGS. 10A and 10B show side and perspective views of a front-panel electrical interconnection system according to a fourth embodiment of the present invention.
Figure 10B:
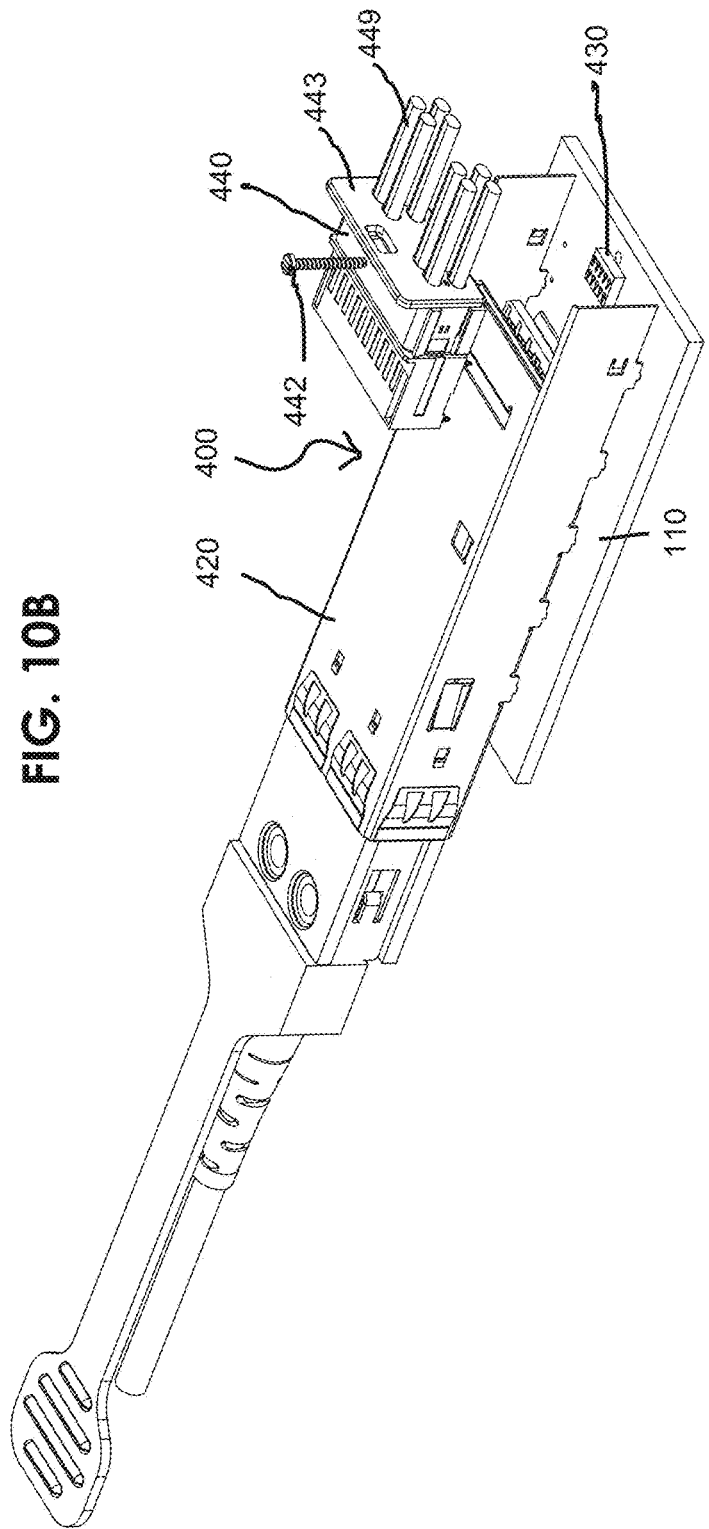

FIGS. 10A and 10B show side and perspective views of a detachable, cabled front-panel connector according to a fourth embodiment of the present invention. In the fourth embodiment, a front end of a cage 420 may extend to a slot in a front panel that may be mounted in an electronics rack or the like (not shown in FIGS. 10A and 10B). The detachable connector 440 of the connector 400 may fit into a rear end of the cage 420, which is mounted to the substrate 110. The insertion direction of the detachable connector 440 into the cage 420 may be substantially normal to, parallel with, or at an oblique angle to the top surface of the substrate 110 to which the cage 420 is mounted. For example, FIGS. 10A and 10B show that the detachable connector 440 can inserted from a normal or substantially normal direction within manufacturing tolerances. The cage 420 can also include a mechanical support or a mechanical guide for the detachable connector 440. The cage 420 may secure or at least partly secure the detachable connector 440 to a fixed connector 430 mounted to the substrate 110. The detachable connector 440 can include a cover 443 that covers the rear of the cage 420, defining a back wall of the cage 420. The cover 443 can be made of metal or a metal-covered plastic. When the detachable connector 440 is mated with the fixed connector 430, the cover 443 can help reduce EMI from a rear of the cage 420. In addition, a cover can be used to cover the cutout in the top of the cage 420 through which the detachable connector 440 was inserted to mate with the fixed connector 430.

The fourth embodiment may not include a fixed connector, and the detachable connector 440 may instead be connected to electrical contact pads located on the top surface of the substrate 110. The detachable connector 440 of the connector 400 may include flexible contact fingers that extend out of the bottom of the detachable connector 440 of the connector 400. The flexible fingers may be implemented by a cantilevered beam or a pogo pin, for example. The flexible contact fingers make electrical contact with the electrical contact pads located on the top surface of the substrate 110. The flexible fingers may provide continuous electrical contact between the substrate 110 and the detachable connector 440 even if the distance between the detachable connector 440 and substrate 110 changes. That is, the detachable connector 440 may be able to mechanically float in a direction perpendicular or substantially perpendicular to the top surface of the substrate 110. In directions parallel or substantially parallel to the top surface of the substrate 110, the detachable connector 440 may be rigidly secured. The electrical connections between the detachable connector 440 and the substrate 110 may transmit low-speed signals, including control and/or power signals. Electrical cables 449 that transmit high-speed electrical signals to or from the detachable connector 440 may also be connected to the detachable connector 440.

The detachable connector 440 may be secured to the substrate 110 by a fastener 442, for example, a bolt or screw. The fastener may engage with a fastener anchor, for example, a nut, located on an opposed side of the substrate 110 from the cage. Alternatively, the fastener 442 may engage with another structural feature incorporated in the cage 420, the fixed connector 430, or the substrate 110. In addition, the fastener 442 may incorporate a spring-loaded shaft that secures the detachable connector 440 to the substrate 110 while also allowing the detachable connectors to float in a vertical direction, for example, closer to or farther from the substrate 110. Because the detachable connector 440 is fixed in the module-mating direction by a fastener 442, an edge-card from the interconnection module 150 may be inserted into the detachable connector 440 without the detachable connector being pushed away from the interconnection module 150. The cage 420 can have a cutout that allows the detachable connector 440 to be mated and unmated with the fixed connector 430. A cover (not shown) can be used to cover the cutout after the detachable connector 440 is mated with the fixed connector 430 to reduce EMI. The cover can be separate from the detachable connector 440 or can be attached to and be a part of the detachable connector 440 such that the cover covers the cutout when the detachable connector 440 is mated with the fixed connector 430. The cover can provide a latching mechanism to secure the detachable connector 440 within the cage 420. Although a latching mechanism can be used, a latching mechanism may not necessary because of the fastener 442 between the fixed connector 430 and the detachable connector 440 can secure the detachable connector 440 when the interconnection module 150 is mated and unmated with the detachable connector 440.

In a first modification of the fourth embodiment, the flexible contact fingers may be located in an interposer that is positioned between the substrate 110 and the detachable connector 440, which can be an implementation of the interconnection system of FIGS. 14A and 14B. Accordingly, both the bottom of the detachable connector 440 and the top of the substrate 110 may include contact pads that are able to connect to opposing sides of the interposer. In a second modification of the fourth embodiment, low-speed signals, including power and/or control signals, may be transmitted to or from the detachable connector 440 by an electrical cable, a twisted pair of electrical wires, or any flexible electrical connector, which can be an implementation of the interconnection system of FIGS. 15A and 15B.

In each of the embodiments and modifications described above, the detachable connectors may be secured to the substrate 110 by a fastener, for example, a bolt or screw. The fastener may engage with a fastener anchor, for example, a nut, located on an opposed side of the substrate 110 from the cage. Alternatively, the fastener may engage with another structural feature incorporated in the cages 420, the fixed connector 430 or the substrate 110. In addition, the fastener may incorporate a spring loaded shaft that secures the detachable connectors to the substrate 110 while also allowing the detachable connectors to float in a vertical direction perpendicular to the substrate 110, for example, closer to or farther from the substrate 110.

The cages may also include structural features that secure the detachable connectors. These features may include, for example, guides that restrict mating and unmating directions and ranges of the detachable connectors, positioning and latching features, and structural elements that secure the detachable connectors within a predetermined position or range of positions. The positioning and latching features can constrain the detachable connectors in all directions and rotations or can constrain the detachable connectors in only certain directions and rotations while at least partially allowing range of motion along other directions or rotations. The detachable connectors can also include ESD (electrostatic discharge) and EMI (electromagnetic interference) shielding features complementary to the ESD/EMI features of the cages. For example, structural elements that provide an electrical connection between the detachable connector 440 and cage 420. when the detachable connectors are mated to the cages.

The detachable, cabled front-panel connectors according to the embodiments of the present invention allow a user to easily remove the electrical cables from the substrate 110 prior to any reworking of the substrate 110. In addition, the fixed connectors may be attached to the substrate 110 by an SMT process. Thus, the detachable, cabled front-panel connector provides greater flexibility in system integration and ease of system assembly. The detachable front-panel connector can also be modular, and a defective connector can be easily replaced one or multiple times without affecting the reliability of the press fit or other connections with the substrate 110. The mating interface between the fixed connectors and the detachable connectors may include structures and materials that withstand many insertions, for example, about 10, about 20, about 50, about 100, or even about 1000 or more insertions. Accordingly, the detachable, cabled front-panel connector can be used in test system, for example, in which the detachable connectors are regularly replaced. Furthermore, with the detachable, cabled front-panel connector, the electrical cables can be removed before any rework on the substrate requiring a temperature excursion or the like that is not compatible with the electrical cables.

Figure 11:
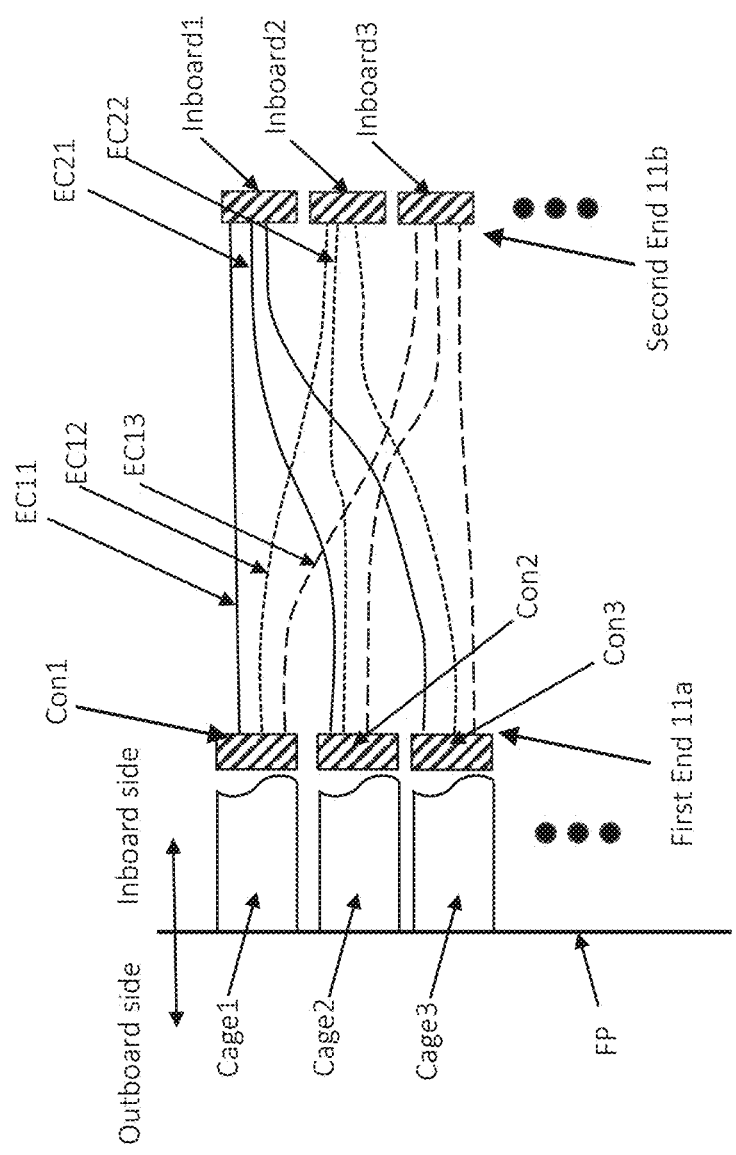
FIG. 11 shows a plan view of an electrical interconnection system for an electronics rack according to a fifth embodiment of the present invention.

FIG. 11 shows a plan view of an electrical interconnection system for an electronics rack according to a fifth embodiment of the present invention. Cages, denoted as Cage1, Cage2, and Cage3, are mounted to a front panel FP at an inboard side of the front panel FP. Although three cages Cage1, Cage2, and Cage3 are shown in FIG. 11, any number of cages may be provided, for example, two cages, four cages, or more than four cages. In FIG. 11, on an inboard side opposite to an outboard side of the front panel FP, each of the cages Cage1, Cage2, and Cage3 has been cut away to provide a view of an electrical connector, designated as Con1, Con2, and Con3, located at or near a corresponding inboard end of each cage Cage1, Cage2, and Cage3. A first end 11*a* of each of the electrical cable EC11 and EC12 is attached to first electrical connector Con1. A first end 11*a* of each of the electrical cables EC21 and EC22 is attached to second electrical connector Con2. A second end 11*b*, opposing the first end 11*a*, of each of the electrical cables EC11 and EC21 is attached to a first inboard connector Inboard1. A second end 11*b*, opposing the first end 11*a*, of each of the electrical cables EC12 and EC22 is attached to a second inboard connector Inboard2.

If two or more electrical connectors are provided (for example, third electrical connector Con3 as shown in FIG. 11), the electrical cables that are attached to each of the electrical connectors may fan out, with each electrical connector Con1, Con2, and Con3 including at least one electrical cable that connects to each of the inboard connectors Inboard1, Inboard2, and Inboard 3. For example, as shown in FIG. 11, a first end 11*a* of an electrical cable EC13 may be connected to the first electrical connector Con1, and a second end 11*b* of the electrical cable EC13 may be connected to the third inboard connector Inboard3. The electrical connectors Con1, Con2, and Con3 can be implemented as a single detachable connector as shown, for example, in FIGS. 2A to 5B or can be implemented as separate detachable connectors as discussed above with respect to, for example, FIGS. 8C to 8E and 9A to 9C.

Accordingly, a first end of each of the electrical cables may be connected to a first end of each of the electrical connectors and the opposed second end of each of the electrical cables may be connected to a second end of each of the inboard connectors. That is, each of the electrical connectors and each of the inboard connectors may be attached to a plurality of cables. At least one of the electrical connectors may have electrical cables attached to a plurality of inboard connectors, and the electrical cables may provide an electrical connection between the at least one electrical connector and a plurality of inboard connectors. Similarly, at least one of the inboard connectors may have electrical cables attached to a plurality of electrical connectors, and the electrical cables may provide an electrical connection between the at least one inboard connector and a plurality of electrical connectors. For example, each of the electrical connectors can be connected to an electrical cable that is connected to all of the inboard connectors. Similarly, each of the inboard connectors can be connected to an electrical cable that is connected to all of the electrical connectors. Accordingly, signals received at the front panel from interconnection modules or the like may fan out to multiple locations on the substrate 110, according to the positions of the inboard connectors. Thus, the fifth embodiment provides easy rework, maintenance, and installation in systems where signal cables or the like fan in/out or are shuffled between sets of electrical connectors and inboard connectors located at opposing ends of a plurality of electrical cables.

Although the embodiments of the present invention have been described above with respect to an SFP (Small Form Factor), QSPF, or QSFP-DD front-panel connection system, the embodiments of the present invention may be applied to any type of front-panel connection system. Furthermore, the features, components, and elements of each embodiment and modification may be replaced or combined with one another.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. An interconnection system configured to be carried by a substrate, the interconnection system comprising:
   a cage that is configured to be connected to the substrate, that includes a first end and a second end opposed to the first end, and that is configured to receive an interconnection module; and
   an electrical connector located at the second end of the cage, wherein
   the electrical connector includes a fixed connector that is configured to be rigidly attached to the substrate and a detachable connector that is configured to be mated and unmated from the fixed connector in a direction not parallel to a receiving direction of the interconnection module.

2. The interconnection system of claim 1, further comprising the substrate, wherein
   the cage is mounted to a first surface of the substrate; and
   the detachable connector mechanically floats in a direction orthogonal or substantially orthogonal to the first surface of the substrate and does not mechanically float in a direction parallel or substantially parallel to the first surface of the substrate.

3. The interconnection system of claim 1, further comprising a cable including a first end connected to the detachable connector.

4. The interconnection system of claim 1, wherein the detachable connector is removable from the cage.

5. The interconnection system of claim 1, wherein the detachable connector is removable from the cage without desoldering any electrical connections.

6. The interconnection system of claim 1, wherein the fixed connector includes contact fingers that make electrical contact with contact pads on the detachable connector when the detachable connector is mated to the fixed connector.

7. The interconnection system of claim 1, wherein the detachable connector includes contact fingers that make electrical contact with contact pads on the fixed connector when the detachable connector is mated to the fixed connector.

8. The interconnection system of claim 1, wherein the fixed connector does not include any electrical contact.

9. An interconnection system comprising:
a cage that includes a first end and a second end opposed to the first end and that is configured to receive an interconnection module; and
an electrical connector located at the second end of the cage; wherein
the electrical connector includes a fixed connector which includes soldered electrical connections and a detachable connector that is removable from the cage without desoldering any electrical connections; and
the detachable connector is configured to directly mate and unmate with the interconnection module when the interconnection module is inserted in the cage.

10. The interconnection system of claim 9, wherein
the first and the second ends of the cage define a module-mating direction; and
the detachable connector mechanically floats in a direction orthogonal or substantially orthogonal to the module-mating direction and does not mechanically float in a direction parallel or substantially parallel to the module-mating direction.

11. The interconnection system of claim 9, further comprising a cable including a first end connected to the detachable connector.

12. An interconnection system comprising:
a cage that includes a first end and a second end opposed to the first end and that is configured to receive an interconnection module at the first end;
a detachable connector positioned at the second end of the cage; and
a fixed connector mechanically connected to the detachable connector; wherein
the detachable connector is permanently attached to electrical cables that are configured to transport high-speed signals,
the detachable connector includes an electrical connection that is configured to transport low-speed and power signals, and
the detachable connector is configured to mate and unmate with the interconnection module.

13. The interconnection system of claim 12, wherein the fixed connector electrically connects with the electrical connection.

14. The interconnection system of claim 12, wherein the fixed connector is not electrically connected to the detachable connector.

15. The interconnection system of claim 12, wherein the detachable connector includes a plurality of detachable connectors.

16. The interconnection system of claim 15, wherein some of the detachable connectors are configured to transport high-speed electrical signals and some of the detachable connectors are configured to transport low-speed signals.

17. The interconnection system of claim 12, wherein the electrical connection mates with an interposer.

18. The interconnection system of claim 1, wherein the detachable connector is configured to mate with a card-edge of the interconnection module.

19. The interconnection system of claim 9, wherein the detachable connector is configured to mate with a card-edge of the interconnection module.

* * * * *